(12) United States Patent
Yamada

(10) Patent No.: US 9,926,136 B2
(45) Date of Patent: Mar. 27, 2018

(54) ARTICLE MANAGEMENT SYSTEM AND TRANSPORT ROBOT

(71) Applicant: PANASONIC INTELLECTUAL PROPERTY CORPORATION OF AMERICA, Torrance, CA (US)

(72) Inventor: Kazunori Yamada, Aichi (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/472,963

(22) Filed: Mar. 29, 2017

(65) Prior Publication Data

US 2017/0197788 A1    Jul. 13, 2017

Related U.S. Application Data

(63) Continuation of application No. 14/660,069, filed on Mar. 17, 2015, now Pat. No. 9,643,779.

(60) Provisional application No. 61/972,537, filed on Mar. 31, 2014.

(30) Foreign Application Priority Data

Nov. 5, 2014 (JP) ................. 2014-225432

(51) Int. Cl.
*B65G 1/04*    (2006.01)
*B25J 5/00*    (2006.01)
*B25J 9/00*    (2006.01)
*B25J 11/00*   (2006.01)
*B25J 19/02*   (2006.01)

(52) U.S. Cl.
CPC ............ *B65G 1/0492* (2013.01); *B25J 5/007* (2013.01); *B25J 9/0003* (2013.01); *B25J 11/0005* (2013.01); *B25J 11/008* (2013.01); *B25J 19/023* (2013.01)

(58) Field of Classification Search
CPC .................................................. B65G 1/0492
See application file for complete search history.

(56) References Cited

U.S. PATENT DOCUMENTS

| 2010/0316468 A1 | 12/2010 | Lert et al. | |
| 2011/0106295 A1* | 5/2011 | Miranda | B65G 1/1378 700/216 |
| 2014/0365258 A1* | 12/2014 | Vestal | G06Q 10/063114 705/7.15 |

FOREIGN PATENT DOCUMENTS

JP    2004-231357    8/2004

* cited by examiner

*Primary Examiner* — Kyle O Logan
(74) *Attorney, Agent, or Firm* — Greenblum & Bernstein, P.L.C.

(57) ABSTRACT

An article management system includes a transport robot that transports an article and a rack robot that stores the article. The transport robot includes an input that receives a transport request that includes a request to transport the article to the rack robot, a first circuit that transmits the transport request to the rack robot and a movement mechanism that causes the transport robot to move toward the rack robot. The rack robot includes a second circuit that receives the transport request from the first circuit, a conveyor that receives the article based on the transport request from the transport robot and moves the article to a storage location, and a port where the article is transferred to the transport robot. The conveyor moves the article between one of a plurality of racks and the port.

2 Claims, 29 Drawing Sheets

FIG. 6

| DATE/TIME | PLACE | POSTURE | REQUESTED ARTICLE |
|---|---|---|---|
| 1/3/2014 15:23 | LIVING ROOM | LYING | BEER |
| 1/4/2014 18:40 | KITCHEN | STANDING | TOWEL |
| 1/10/2014 17:38 | LIVING ROOM | SITTING | SCISSORS |
| 1/15/2014 19:55 | KITCHEN | STANDING | TOWEL |
| ... | ... | ... | ... |

FIG. 8

| STORAGE LOCATION | ARTICLE | REMARKS |
|---|---|---|
| RACK 1 | SCISSORS | |
| RACK 2 | TOWEL | |
| RACK 3 | BEER | REFRIGERATED STORAGE |
| RACK 4 | EYEGLASSES | |
| ... | ... | ... |

FIG. 16

|  | TATAMI MAT | FLOORING | CARPET |
|---|---|---|---|
| ROUGHNESS OF SURFACE | MEDIUM | LOW | HIGH |
| PRESENCE OF OTHER ROBOTS | NO | IN OPERATION | NO |
| PRESENCE OF OTHER PERSONS, ANIMALS | NO | YES | UNKNOWN |

FIG. 17

|  | RISK OF FALLING | ALLOWABLE VIBRATION | MOVING SPEED |
|---|---|---|---|
| SCISSORS | LOW | LARGE | HIGH-SPEED |
| CUP | MEDIUM | MEDIUM | MEDIUM-SPEED |
| BEER | HIGH | SMALL | LOW-SPEED |
| CELL-PHONE | LOW | LARGE | HIGH-SPEED |

FIG. 27A
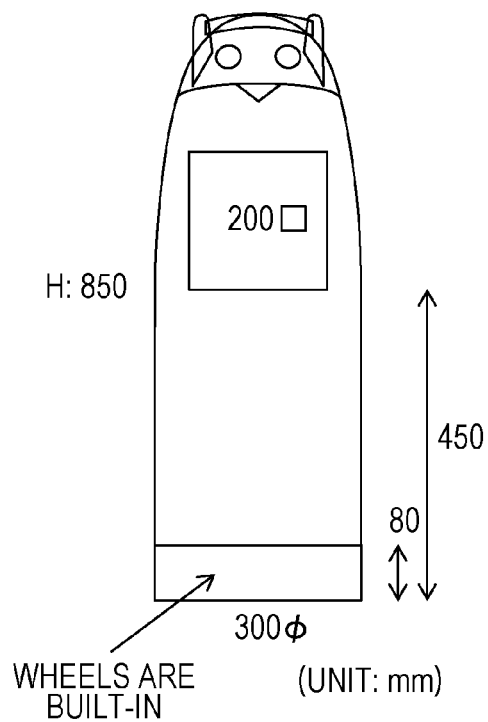
FIG. 27B FIG. 27C
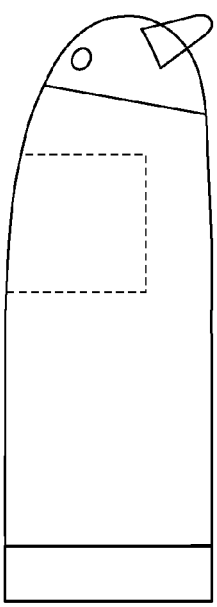 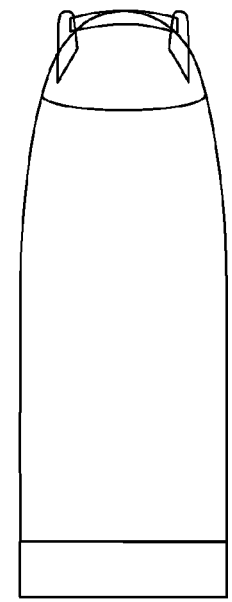
FIG. 27D
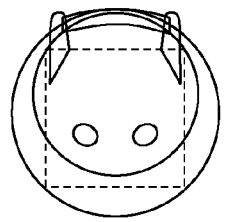

FIG. 28A  FIG. 28B  FIG. 28C
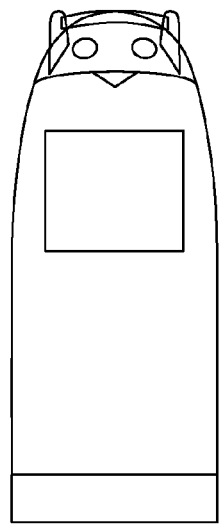
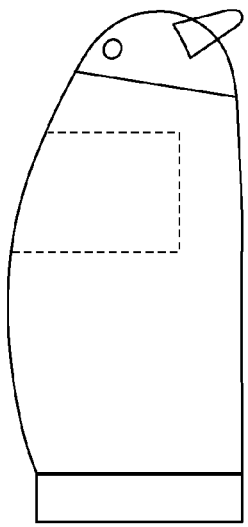
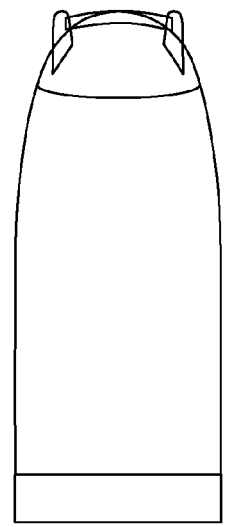
FIG. 28D
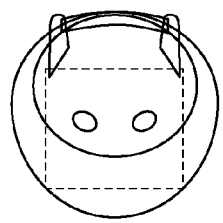

ARTICLE MANAGEMENT SYSTEM AND TRANSPORT ROBOT

This application is a continuation application of U.S. application Ser. No. 14/660,069, filed Mar. 17, 2015, which claims benefit of U.S. Provisional Patent Application No. 61/972,537, filed Mar. 31, 2014, which claims the benefit of Japanese Application No. 2014-225432, filed Nov. 5, 2014. The entire disclosures of the above-identified applications, including the specifications, drawings and claims are incorporated herein by reference in their entireties.

BACKGROUND

1. Technical Field

The present disclosure relates to a system, a device, and a control method that achieve a service for managing and transporting articles in a building.

2. Description of the Related Art

In recent years, it has been possible to connect plural devices in a building via a network and to control the devices using computation resources on a cloud. Fine control of the devices according to the living conditions of a user has increased the convenience of life. However, management of an article such as transporting an article or storing an article is often accompanied by manual operations of a user himself or herself, and thus there is room for improvement in the convenience.

On the other hand, in the past several years, autonomous moving robots such as cleaning robots have been widely used in home environments. With the advent of such home electronics that move around in a house, there is increasing possibility of providing users with new functions which have never been achieved by the home electronics before. These days, research and presentation of transport robots are being conducted, the transport robots utilizing autonomous moving function to bring an article according to a command of a user.

Japanese Unexamined Patent Application Publication No. 2004-231357 discloses an example of robot that manages and transports articles. Japanese Unexamined Patent Application Publication No. 2004-231357 discloses a mechanism in which a rack having a movable portion moves a requested article to a withdrawal section and hands over the article to a transport robot.

SUMMARY

One non-limiting and exemplary embodiment provides a system that achieves efficient transport and storage of articles by reducing management of the articles and a load of transport of the articles by a user.

In one general aspect, the techniques disclosed here feature an article management system including a rack robot that stores a first article and a transport robot that transports the first article. The transport robot includes an input interface that receives a first request from a user, the first request includes a request to transport the first article stored in the rack robot to the user, a first communication circuit that transmits the first request to the rack robot, and a movement that causes the transport robot to move toward the rack robot. The rack robot includes a second communication circuit that receives the first request transmitted from the first communication circuit, and a conveyor that moves the first article on the first request from a storage location of the first article to a hand-over location for the transport robot, the hand-over location being used for moving the first article from the rack robot to the transport robot The above-mentioned aspect may be achieved by a system, a method, an integrated circuit, a computer program, or a recording medium. Alternatively, the aspect may be achieved by any combination of a system, a device, a method, an integrated circuit, a computer program, and a recording medium.

According to the present disclosure, a transport robot is capable of autonomously transporting a desired article according to a command of a user, thereby achieving comfortable and efficient transport of articles.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a table illustrating an example of information stored in a request history DB;

FIG. 8 is a table illustrating an example of information stored in a stored article information DB;

FIG. 16 is a diagram illustrating a table that stores surface roughness, presence of other robots, and presence of other persons, animals for each type of floor;

FIG. 17 is a table illustrating that risk of falling, allowable vibration, the moving speed in the rack robot 1001 and the moving speed of the transport robot 1002 are different depending on a transport article;

FIGS. 27A to 27D respectively illustrate a front view, a left side view, a rear view, and a top view of the transport robot 1002;

FIGS. 28A to 28D respectively illustrate a front view, a left side view, a rear view, and a top view of another example of design of the transport robot 1002.

DETAILED DESCRIPTION

Figure 1A:
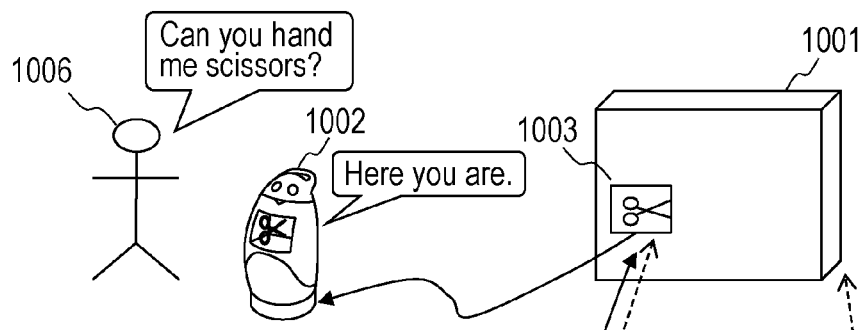
FIGS. 1A to 1E illustrate an entire configuration example of an article management system in an embodiment of the present disclosure.

Before a specific embodiment of the present disclosure is described, the outline of the embodiment of the present disclosure is described.

The present disclosure includes an article management system and a transport robot that are described in the following aspects.

[Aspect 1]

An article management system includes a transport robot that transports an article; and a rack robot that stores an article. The transport robot includes an input interface that receives a transport request from a user, the transport request having at least one of a request to transport an article handed by the user to the rack robot and a request to transport an article stored in the rack robot to the user, a first communication circuit that transmits a notification based on the transport request to the rack robot after the input interface receives the transport request, and a movement mechanism that causes the transport robot to move to the rack robot after the first communication circuit transmits the notification. The rack robot includes a second communication circuit that receives the notification transmitted from the first communication circuit, and a conveyor mechanism that, after the second communication circuit receives the notification, moves an article on the transport request from a storage location of the article to a hand-over location for the transport robot, or receives the article on the transport request from the transport robot and moves the article to a predetermined storage location.

[Aspect 2]

The article management system according to aspect 1, in which the transport robot further includes a first control circuit that controls the first communication circuit and the movement mechanism, the rack robot further includes a second control circuit that controls the second communication circuit and the conveyor mechanism, when the transport request includes a request to move an article stored in the rack robot to the user, the first control circuit causes the first communication circuit to transmit the notification, controls the movement mechanism to move the transport robot to the rack robot, then to the user after the article on the transport request is handed over to the transport robot from the rack robot, and after the second communication circuit receives the notification, the second control circuit controls the conveyor mechanism to move the article on the transport request from the storage location to the hand-over location.

[Aspect 3]

The article management system according to aspect 2, in which the first control circuit calculates a movement path to the rack robot and a movement time, the second control circuit calculates a hand-over time which is taken to move the article on the transport request to the hand-over location since the second communication circuit received the notification and causes the second communication circuit to transmit information indicating the hand-over time, and after the first communication circuit receives the information indicating the hand-over time from the second communication circuit, the first control circuit compares the movement time with the hand-over time, and when the movement time is shorter than the hand-over time, the first control circuit controls the movement mechanism to delay start of movement of the transport robot to the rack robot by a time period corresponding to a difference between the movement time and the hand-over time.

[Aspect 4]

The article management system according to aspect 3, in which the first control circuit causes the first communication circuit to transmit information indicating the movement time, and after the second communication circuit receives the information indicating the movement time, the second control circuit compares the movement time with the hand-over time, and when the hand-over time is shorter than the movement time, the second control circuit controls the conveyor mechanism to delay start of movement of the article by a time period corresponding to a difference between the movement time and the hand-over time.

[Aspect 5]

The article management system according to aspect 3 or 4, in which the rack robot includes at least one rack that has a function of processing a stored article, and when the article on the transport request is stored in the rack, the second control circuit calculates the hand-over time including a time taken to process the article.

[Aspect 6]

The article management system according to one of aspects 3 to 5, in which the first control circuit determines the movement path and a speed of the movement of the transport robot based on map information that records roughness of a floor surface, and presence of a person other than the user, an animal or other robot for each area on the floor surface.

[Aspect 7]

The article management system according to one of aspects 2 to 6, in which before the input interface receives the transport request, the first control circuit predicts an article to be requested based on detection information outputted from a sensor that detects a state of the user and on history information that records correspondence relationship between an article on a transport request in past and the state of the user when the request is made, and causes the first communication circuit to transmit information on the predicted article, and when the second communication circuit receives the information on the predicted article, the second communication circuit controls the conveyor mechanism to move the article from the storage location to a location nearer to the hand-over location in advance.

[Aspect 8]

The article management system according to aspect 7, in which when the input interface receives the transport request, the first control circuit adds the article on the transport request and information on the state of the user to the history information.

[Aspect 9]

The article management system according to aspect 7 or 8, in which the sensor is provided externally of the transport robot and transmits the detection information to the transport robot.

[Aspect 10]

The article management system according to aspect 7 or 8, the transport robot has the sensor.

[Aspect 11]

The article management system according to one of aspects 1 to 10, in which the rack robot includes plural racks having a rack for delivery which has a structure that allows a delivery company to take in and out an article, the conveyor mechanism moves a certain article to the rack for delivery, the certain article having a lower frequency of transport request than a predetermined frequency and being included in articles stored in the racks, and the second communication circuit transmits a delivery request to a server of the delivery company, the delivery request on the certain article to be delivered to an external warehouse.

[Aspect 12]

The article management system according to one of aspects 2 to 11, in which when the transport request includes a request to move an article stored in the rack robot to the user, only in the case where a predetermined condition associated with the article is satisfied, the second control circuit controls the conveyor mechanism to hand over the article to the transport robot.

[Aspect 13]

The article management system according to aspect 12, in which the predetermined condition is that approval of a particular person other than the user is obtained, and to obtain approval of the person, the second control circuit inquires of an information device owned by the person whether or not the transport request is permitted, and commands the transport robot to stay on stand-by while the inquiry is being made.

[Aspect 14]

The article management system according to one of aspects 1 to 13, in which the rack robot includes a hand-over section where the article is handed over or returned to or from the transport robot and plural racks that store an article, and the conveyor mechanism moves the article between one of the racks and the hand-over section.

[Aspect 15]

A transport robot that is used in an article management system including a transport robot that transports an article and a rack robot that stores an article, the transport robot includes an input interface that receives a transport request from a user, the transport request having a request to transport an article stored in the rack robot to the user, a communication circuit that, after the input interface receives the transport request, transmits a notification based on the transport request to the rack robot, and receives information indicating a hand-over time which is taken to move the article on the transport request to the hand-over location for the transport robot since the rack robot received the notification, a movement mechanism that causes the transport robot to move to the rack robot after the communication circuit transmits the notification, and a control circuit that controls the communication circuit and the movement mechanism, wherein the control circuit calculates a movement path to the rack robot and a movement time, compares the movement time with the hand-over time, and when the movement time is shorter than the hand-over time, the control circuit controls the movement mechanism to delay start of movement of the transport robot to the rack robot by a time period corresponding to a difference between the movement time and the hand-over time.

Hereinafter, a specific embodiment of the present disclosure is described with reference to the drawings.

Embodiment

The present embodiment relates to an article management system in which a transport robot works in coordination with a rack robot to transport and manage an article according to a command of a user.

Figure 1B:
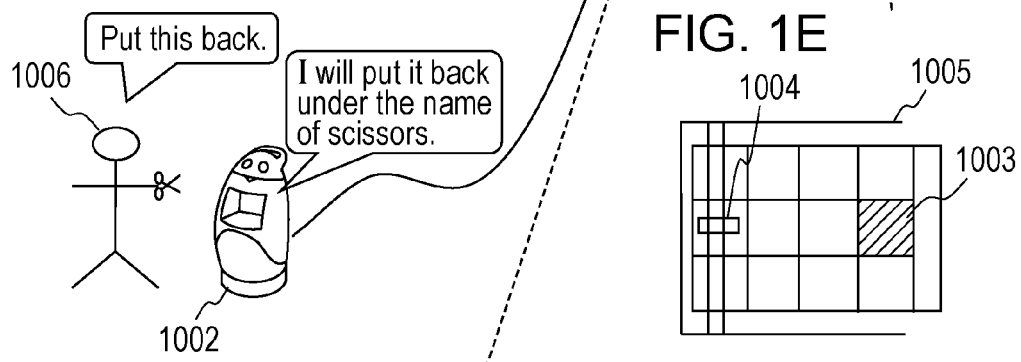

FIGS. 1A to 1E schematically illustrate an entire configuration example of an article management system in the present embodiment. As illustrated in FIGS. 1A to 1E, an article management system in the present embodiment includes a rack robot 1001 that stores an article and a transport robot 1002 that transports an article. The rack robot 1001 has at least one area (which is called rack") where an article is stored inside the body, and a hand-over section 1003 where an article is handed over or returned to or from the transport robot 1002. The transport robot 1002 receives a request to transport an article from a user, and moves to the rack robot 1001 to receive the article from the rack robot 1001. As illustrated in FIG. 1A, the transport robot 1002 is able to transport an article stored in the rack robot 1001 to a user according to a request from the user. On the other hand, as illustrated in FIG. 1B, the transport robot 1002 is able to transport an article received from a user to the rack robot 1001 according to a request from the user.

Figure 1E:
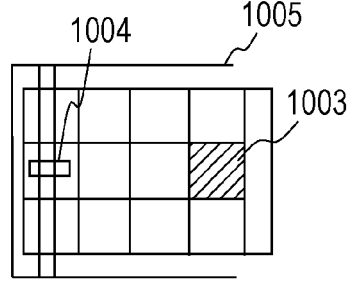
Figure 1C:
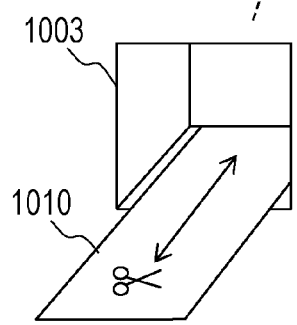

FIG. 1C illustrates a configuration example of the hand-over section 1003 in the rack robot 1001. The hand-over section 1003 enables hand-over and reception of an article to and from the transport robot 1002 using a belt mechanism 1010. The belt mechanism 1010 includes a belt, a roller, and a motor (the latter two are not illustrated) and is able to hand over an article to the transport robot 1002 and to receive an article from the transport robot 1002. In the example illustrated in FIGS. 1A to 1E, the belt mechanism 1010 hands over or receives an article to or from the transport robot 1002 by inserting a belt into a hollow which is provided in the chest of the transport robot 1002.

Figure 1D:
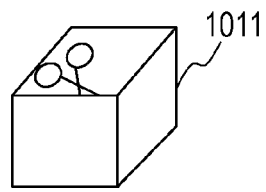

A mechanism to achieve hand-over and reception between the rack robot 1001 and the transport robot 1002 is not limited to the belt mechanism 1010. For example, a configuration may be adopted in which the rack robot 1001 or the transport robot 1002 uses a hook or a manipulator (arm) for hand-over and reception of an article. Alternatively, as illustrated in FIG. 1D, part or all of the articles may be stored in a tray 1011. Handling an article along with the tray 1011 in a fixed shape enables safe hand-over and reception of an article with a simple mechanism.

FIG. 1E schematically illustrates an example of mechanism of the back of the rack robot 1001. In this example, the rack robot 1001 has, on its back, a rail 1005 and an article moving device 1004 that moves along the rail 1005. This enables movement of an article between any storage location in the rack and the hand-over section 1003 as well as change of arrangement of the articles in storage locations. As long as such movement of an article in the rack is achieved, other mechanisms such as a belt may be used instead of the rail. A mechanism that moves an article may be provided in a location other than the back of the rack robot 1001. In the present description, the above-mentioned mechanism that moves an article within the rack robot 1001 and achieves hand-over and reception of the article to and from the transport robot 1002 is referred to as a "conveyor mechanism".

Figure 2A:
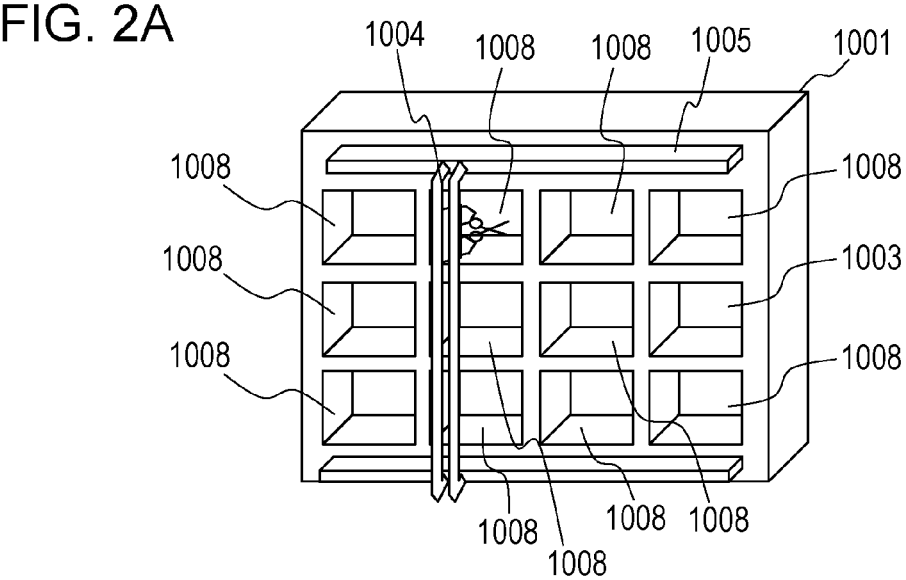
FIGS. 2A to 2C are each a first illustration for explaining the operation of a rack robot.
Figure 2B:
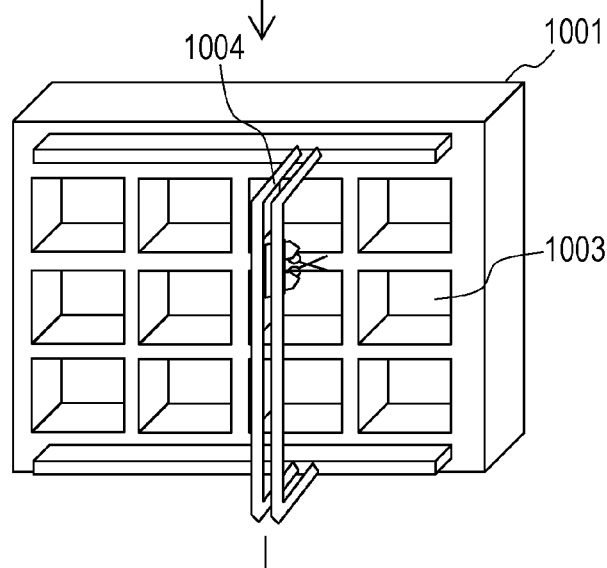
Figure 2C:
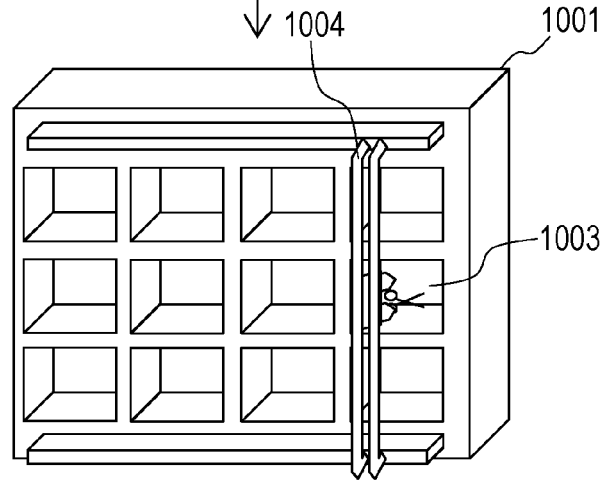

FIGS. 2A to 2C are each a schematic perspective view for illustrating the operation of the conveyor mechanism on the back of the rack robot 1001 in detail. Here, an example is described in which the article moving device 1004 same as the example of FIG. 1E is used. In the example illustrated in FIGS. 2A to 2C, the rack robot 1001 has 12 areas that are arranged in 3 rows and 4 columns, one of which (in the 2nd row and 4th column) is the hand-over section 1003. The 11 areas other than the hand-over section 1003 are each an area (rack) for storing an article. As an example, FIGS. 2A to 2C illustrate a process of moving an article (scissors in this example) to the hand-over section 1003 in the 2nd row and 4th column, the article being housed in the rack 1008 in the 1st row and 2nd column. FIG. 2A illustrates an initial state, FIG. 2B illustrates a state in which the article is on the move, and FIG. 2C illustrates a state in which the movement is completed. In this manner, the article moving device 1004 is capable of moving an article at will between the plural racks 1008 and the hand-over section 1003.

Figure 3A:
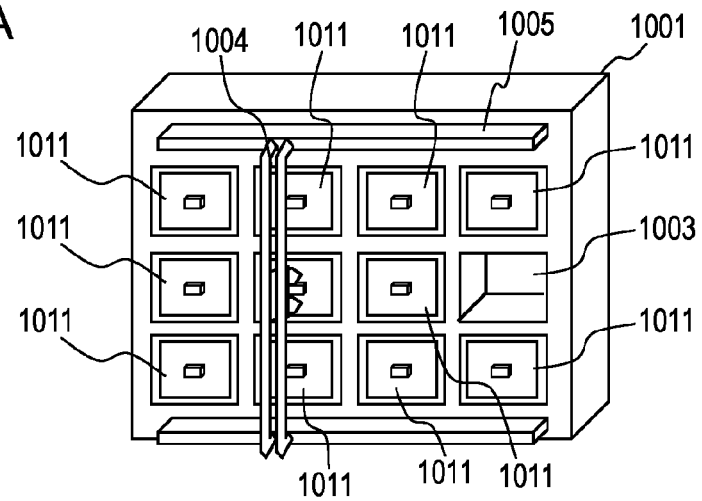
FIGS. 3A to 3C are each a second illustration for explaining the operation of a rack robot.
Figure 3B:
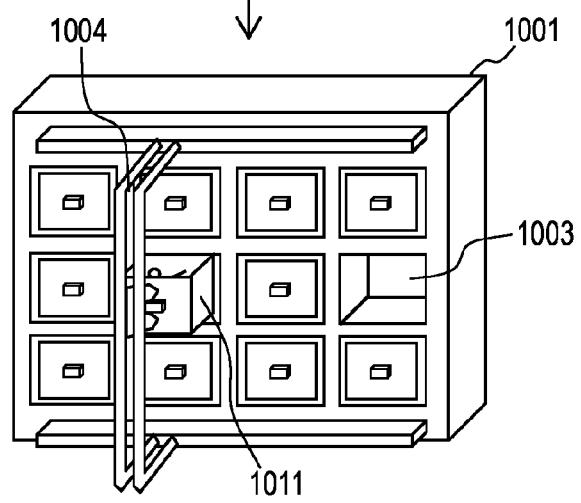
Figure 3C:
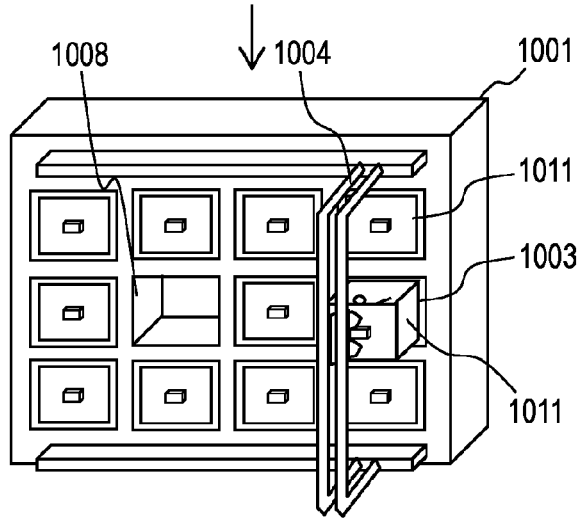

FIGS. 3A to 3C are each a schematic perspective view for illustrating an example operation of the conveyor mechanism when an article is housed and stored in the tray 1011. As an example, FIGS. 3A to 3C illustrate a process of moving an article housed in the rack of the 2nd row and 2nd column to the hand-over section 1003 in the 2nd row and 4th column. FIG. 3A illustrates an initial state, FIG. 3B illustrates a state in which the article is on the move, and FIG. 3C illustrates a state in which the movement is completed and the article is being placed in the hand-over section 1003. The article moving device 1004 in this example moves the article along with the tray. This mechanism achieves hand-over and reception of an article in much simpler manner than moving an article alone.

In the above-described example, the rack robot 1001 has 12 areas (11 racks and 1 hand-over section) in 3 rows and 4 column. However, any number of areas and any arrangement manner may be adopted. The rack robot 1001 may have at least one area for storing an article. The hand-over section 1003 does not have to be formed in the same shape as the other racks. A configuration may be adopted in which the hand-over section 1003 is not provided but a conveyor mechanism such as the article moving device 1004 directly hands over an article to the transport robot 1002, or directly receives an article from the transport robot 1002.

The transport robot 1002 illustrated in FIGS. 1A to 1E has a voice recognition function. The transport robot 1002 receives a request (herein referred to as a "transport request") regarding transport of an article from a user 1006 through voice interaction with a user. Upon receiving a transport request, the transport robot 1002 transports a requested article from the rack robot 1001 or stores a requested article back into the rack robot 1001. The interaction with a user is not limited to voice, and gesture recognition or an operation in coordination with an information terminal such as a smart phone may be performed. A simple mounting method may be adopted in which the transport robot 1002 is provided with a display on which an article list is displayed, and a user selects a desired article by touching a corresponding display location of the article. In the present description, this type of component that receives a transport request from a user is referred to as an "input interface". The input interface includes, for example, a microphone that achieves voice recognition, a motion sensor that achieves gesture recognition, a communication interface with information terminals such as a smart phone, and a display having a touch screen on which an article list is displayed.

The transport request includes at least one of a request to transport an article handed by a user to the rack robot 1001, and a request to transport an article stored in the rack robot 1001 to a user. Therefore, the transport request may include both types of requests described above. In this case, the transport robot 1002 delivers an article handed by a user to the rack robot 1001, and receives an article on the transport request from the rack robot 1001 and brings the article to the user.

In this manner, the present system achieves the operation of bringing an article and putting an article back according to a command from a user by coordinated work between the rack robot 1001 and the transport robot 1002.

Figure 4:
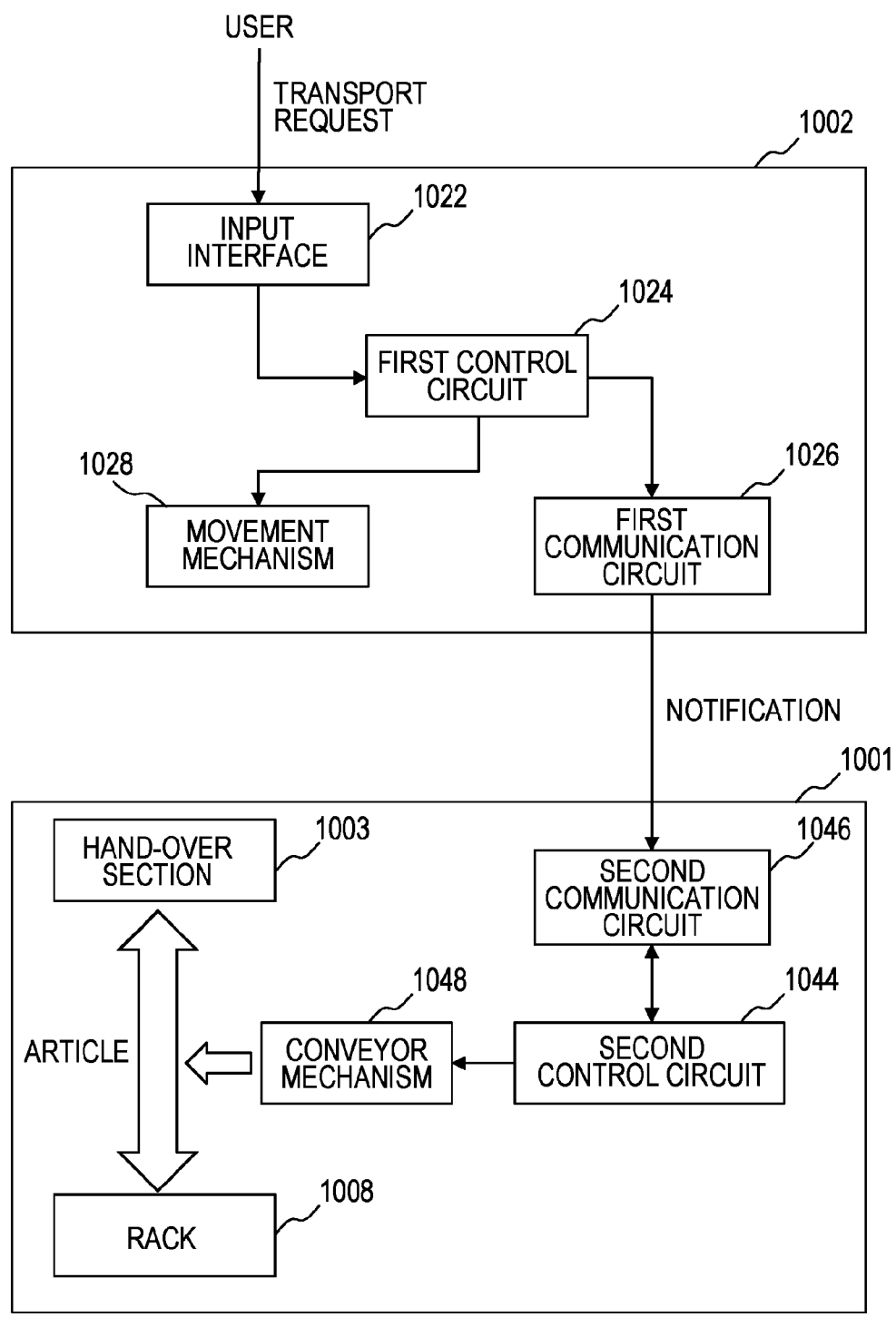
FIG. 4 is a diagram illustrating a schematic configuration of a transport robot 1002 and a rack robot 1001.

FIG. 4 is a diagram illustrating a schematic configuration of an article management system in the present embodiment. A solid line arrow in FIG. 4 indicates a flow of electrical signals. The transport robot 1002 includes an input interface 1022 that receives a transport request from a user, a first communication circuit 1026 that communicates with the rack robot 1001, a movement mechanism 1028 that moves the transport robot 1002, and a first control circuit 1024 that controls the first communication circuit 1026 and the movement mechanism 1028.

The first communication circuit 1026 is a circuit that performs wireless communication with other devices such as the rack robot 1001. After the input interface 1022 receives a transport request, the first communication circuit 1026 transmits a notification based on the transport request to a second communication circuit 1046 in the rack robot 1001.

The movement mechanism 1028 includes, for example, wheels and a motor and is designed to cause the transport robot 1002 to move. After a notification is transmitted by the first communication circuit 1026, the movement mechanism 1028 causes the transport robot 1002 to moves to the rack robot 1001. It is to be noted that "moves to the rack robot" means that the transport robot 1002 moves to a position where an article may be handed over or received to or from the rack robot 1001. Therefore, in the case where it is possible to hand over or receive an article to or from the rack robot 1001 which is away from the transport robot 1002, the transport robot 1002 does not have to move to the vicinity of the rack robot 1001. In the present embodiment, the movement mechanism 1028 is a mechanism that causes the body of the transport robot 1002 to move. However, without being limited to such a mechanism, the movement mechanism 1028 itself may be separated from the body and may move and hand over or receive an article.

The first control circuit 1024 is a processor that controls the operation of the transport robot 1002. The first control circuit 1024 may be achieved, for example, by a combination of a central processing unit (CPU) and a memory that stores programs. Alternatively, the first control circuit 1024 may be a dedicated circuit that is capable of performing the later-described various operations. The first control circuit 1024 is electrically connected to other components to control the components.

The rack robot 1001 includes a second communication circuit 1046 that performs communication with the first communication circuit 1026, a conveyor mechanism 1048 that moves an article within the body of the rack robot 1001, and a second control circuit 1044 that controls the second communication circuit 1046 and the conveyor mechanism 1048.

The second communication circuit 1046 is a circuit that performs wireless communication with other devices such as the transport robot 1002. The second communication circuit 1046 is designed to receive a notification based on a transport request from the first communication circuit 1026.

The conveyor mechanism 1048 is a drive mechanism that moves an article within the rack robot 1001 as described above. The conveyor mechanism 1048 hands over or receives an article on a transport request to or from the transport robot 1002. That is, an article on a transport request is moved from a storage position of the article to a hand-over position for the transport robot 1002, or an article on a transport request is received from the transport robot 1002 and is moved to a predetermined storage position. Here, the "storage position" means the position where the article is stored before a transport request is made. In the present embodiment, the "storage position" is the position of a rack where the article is housed. The "hand-over position" means a position and its vicinity where the transport robot 1002 hands over or receives an article to or from the rack robot 1001. In the present embodiment, the "hand-over position" is the position of the hand-over section 1003. In the present embodiment, movement of an article on a transport request to the hand-over section 1003 caused by the conveyor mechanism 1048 is referred to as "withdrawal".

The second control circuit 1044 is a processor that controls the operation of the rack robot 1001. The second control circuit 1044 may be achieved, for example, by a combination of a CPU and a memory that stores programs. Alternatively, the second control circuit 1044 may be a dedicated circuit that is capable of performing the later-described various operations. The second control circuit 1044 is electrically connected to other components to control the components.

The transport robot 1002 and the rack robot 1001 may include a component other than the components illustrated in FIG. 4. For example, the transport robot 1002 and the rack robot 1001 may include a component, for example, a recording medium (such as a memory, a magnetic disk, an optical disk) that records various programs and databases, a display that displays information on stored articles, and a camera or sensor that detects the surrounding environment and the state of a user.

Figure 5:
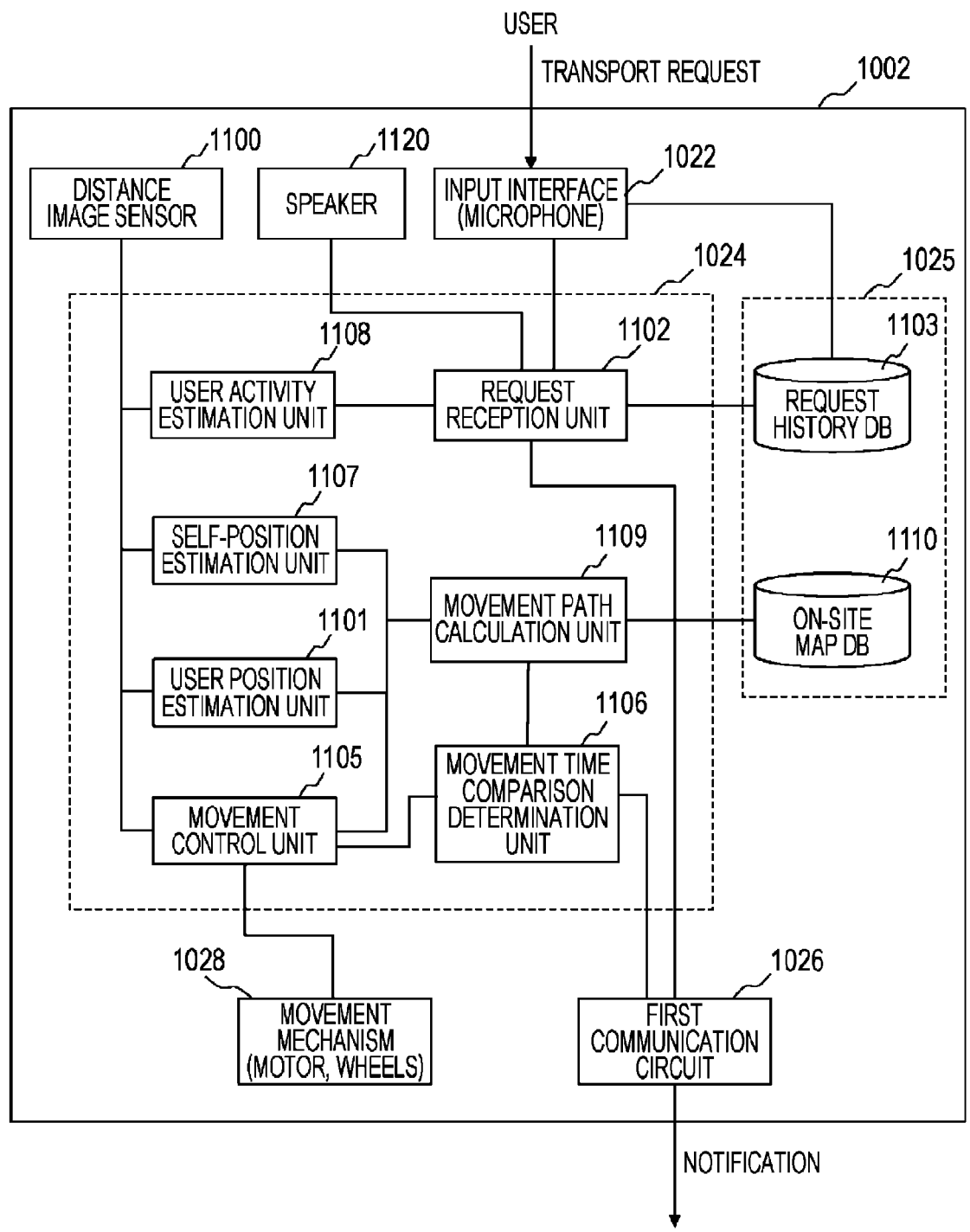
FIG. 5 is a diagram illustrating the configuration of the transport robot 1002.

FIG. 5 is a diagram illustrating a specific configuration example of the transport robot 1002 in the present embodiment. The transport robot 1002 in this example includes a distance image sensor 1100, a speaker 1120, and a recording medium 1025 in addition to the components described above. The distance image sensor 1100 obtains 3-D shape information on the surrounding environment of the transport robot 1002. The recording medium 1025 stores a request history database (DB) 1103 that records history information on transport requests, and an on-site map database 1110 that stores map information on-site.

The first control circuit 1024 includes a user position estimation unit 1101, a request reception unit 1102, a movement control unit 1105, a movement time comparison determination unit 1106, a self-position estimation unit 1107, a user activity estimation unit 1108, and a movement path calculation unit 1109. These functional units may be implemented as physically separated circuits in the first control circuit 1024 or implemented by executing predetermined computer programs by the first control circuit 1024.

The user position estimation unit 1101 estimates the position of a user based on 3-D shape information on the surrounding environment, obtained from the distance image sensor 1100. Similarly, the self-position estimation unit 1107 estimates the position of the transport robot 1002 itself based on the surrounding environment information and on-site map information stored in the on-site map DB 1110. The position relationship between a user and the transport robot 1002 may be recognized by the user position estimation unit 1101 and the self-position estimation unit 1107.

The request reception unit 1102 stores information on the transport request in the request history DB 1103, the information being received from a user through the input interface 1022 including a microphone, and voice interaction using the speaker 1120. More specifically, upon receiving a transport request, the request reception unit 1102 stores a situation at the moment and the content of a request as an associated pair in the request history DB 1103. Upon receiving a transport request, the request reception unit 1102 causes the first communication circuit 1026 to transmit a notification based on the transport request.

The movement control unit 1105 controls the movement mechanism 1028 including wheels and a motor, thereby moving the transport robot 1002 to a destination position. The movement control unit 1105 may be achieved, for example, by a publicly known motor driver. The movement path calculation unit 1109 calculates (estimates) a movement path based on the on-site map information and the destination. When the transport request includes a request to transport an article stored in the rack robot 1001 to a user, the movement time comparison determination unit 1106 determines the timing of starting the movement by the movement mechanism 1028. More specifically, the movement time comparison determination unit 1106 compares a time (referred to as a "movement time") taken for the transport robot 1002 to move to the rack robot 1001 with a time (referred to as "hand-over time" or "withdrawal time") taken for the rack robot 1001 to pick up an article on a transport request and to move the article to the hand-over position (the position of the hand-over section 1003 in this example). When the movement time is shorter than the hand-over time, the movement time comparison determination unit 1106 commands the movement control unit 1105 to delay the start of the movement of the rack robot 1001 by a certain time period (typically the same time period as the difference) corresponding to the difference between the movement time and the hand-over time. In this manner, the timing of the movement of the movement mechanism 1028 is controlled. In order to achieve such control, the movement time comparison determination unit 1106 obtains information indicating a hand-over time from the rack robot 1001 via the first communication circuit 1026. On the other hand, the movement time comparison determination unit 1106 transmits information indicating a movement time to the rack robot 1001 via the first communication circuit 1026 so that similar control may be performed by the rack robot 1001.

The on-site map information stored in the on-site map DB 1110 is information on the layout of rooms on the site, articles placed in the rooms on the site, and information on the roughness of the floor surface, the information being associated with each area on the floor, expressed in terms of two-dimensional coordinate values. The on-site information may include information on the roughness of the floor surface, and the presence of a movable object such as a person other than a user, animals such as a pet, or other robots, the information being recorded for each area on the floor. Here, each area is one of the areas into which the entire floor is divided. Each area may be, for example, a rectangular-shaped area with each side of several centimeters to several meters. In order to achieve smooth movement, the on-site map information may include three-dimensional information. The on-site map information may be generated using a publicly known method such as simultaneous localization and mapping (SLAM) method. The roughness of the floor surface may be detected using, for example, a vibration sensor which is not illustrated.

In a space with high visibility, the self-position, the user position, and the position of the rack robot may be obtained by surrounding environment recognition using the distance image sensor 1100 or other sensors without using a map. It is also possible to set an optimal path and move on the path based on a result of detection by these sensors. For setting a path, a publicly known method such as A-star algorithm (A* algorithm) or Dijkstra's algorithm may be used. In the area on-site excluding a movable object and an obstacle, a shortest path, which allows safe transport, may be estimated by using A* algorithm or Dijkstra's algorithm.

The user activity estimation unit 1108 estimates the activity of a user based on information obtained by the distance image sensor 1100, the information being on the posture of the user and the surrounding environment. According to the state of a user which is estimated from the posture of the user and the surrounding environment, an article to be requested and movement of the user are predictable. For example, the state of a user such as whether the user is standing, sitting or sleeping, and the surrounding environment such as whether the place is a living room or a kitchen may be recognized based on the distance image information obtained by the distance image sensor 1100. The user activity estimation unit 1108 estimates that an article which was requested in similar conditions in the past is likely to be requested, and predicts an article which may be requested. Such prediction allows the transport robot 1002 to move to a user at appropriate timing and allows the rack robot 1001 to prepare an article in advance.

For example, before the input interface 1022 receives a transport request, the user activity estimation unit 1108 predicts an article to be requested based on the detection information outputted from the distance image sensor 1100 and the history information that records correspondence relationship between articles on transport request in the past and the state of the user at the time of each request. The user activity estimation unit 1108 then causes the first communication circuit 1026 to transmit the information on the predicted article. Consequently, the rack robot 1001 may control its operation to place the predicted article of request in the vicinity of the hand-over section 1003 in advance.

The article management system may include two or more rack robots 1001. In this case, articles may be moved to plural rack robots in advance by the transport robot 1002 for efficient arrangement of the articles.

Each time receiving a transport request, the request reception unit 1102 stores a state of a user and the content of a request as an associated pair in the request history DB 1103, the state of a user being estimated by the user activity estimation unit 1108. Thus, in the request history DB 1103, information indicating the article on a transport request and the state of the user at the time of the request are accumulated. When the user activity estimation unit 1108 recognizes that the current state is similar to a user's state stored in the request history DB, the request reception unit 1102 notifies the rack robot 1001 of the content of a request which was made when the user was in the same state in the past. The rack robot 1001 moves the article notified to the vicinity of the hand-over section 1003 in advance, and thus the time taken to transport the article to the hand-over section 1003 may be reduced.

FIG. 6 is a table illustrating an example of table configuration of the request history DB. The request history DB in this example records the date/time, the place, the posture of a user, and a requested article when a transport request is received. The information recorded on the request history DB may be different from what is illustrated in FIG. 6. For example, information to identify a user may be added or information on date/time and place may not be recorded. The position where the transport robot 1002 receives a request, and the position of a user may be separately recorded in detail.

Figure 7:
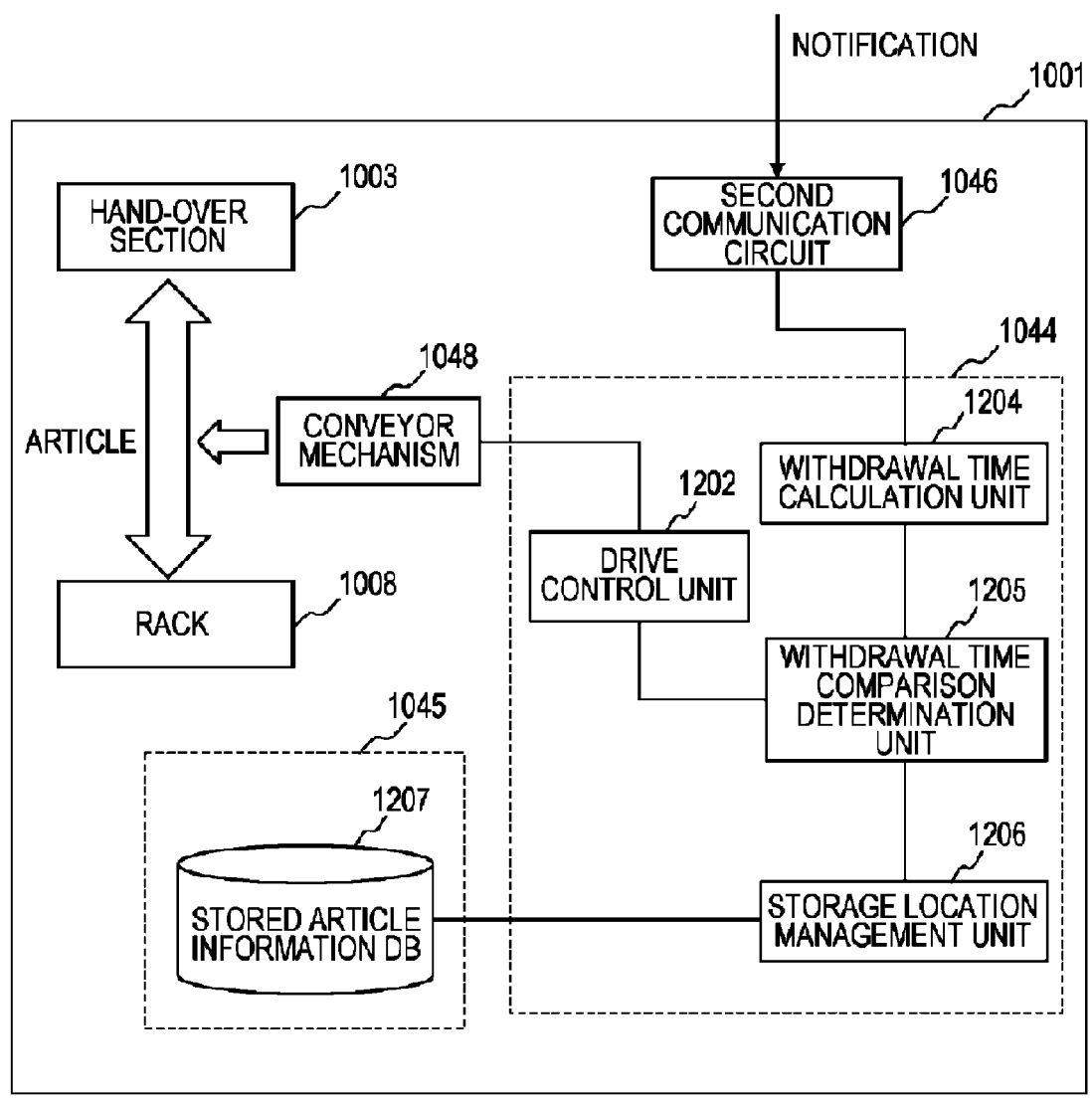
FIG. 7 is a diagram illustrating the configuration of the rack robot 1001.

FIG. 7 is a diagram illustrating the detailed configuration of the rack robot 1001. The rack robot 1001 includes a recording medium 1045 in addition to the components illustrated in FIG. 4. The recording medium 1045 houses stored article information database (DB) 1207. The second control circuit 1044 includes a drive control unit 1203, a withdrawal time calculation unit 1204, a withdrawal time comparison determination unit 1205, and a storage location management unit 1206. These functional units may be implemented as physically separated circuits in the second control circuit 1044 or implemented by executing predetermined computer programs by the second control circuit 1044.

The second communication circuit 1201 receives a notification based on a transport request from a user, transmitted from the transport robot 1002. At this point, the second communication circuit 1201 also receives information on movement time estimated by the transport robot 1002. The withdrawal time calculation unit 1204 calculates a time (withdrawal time) taken to move an article on a transport request from a rack 1008 to the hand-over section 1203. The withdrawal time comparison determination unit 1205 calculates a starting time of a withdrawal operation by comparing the withdrawal time with the movement time of the transport robot 1002. The storage location management unit 1206 records the following as associated items on the stored article information DB 1207: a storage location (for example, rack number) for an article in the rack robot 1001, information (for example, an article name or an article code) to identify an article, and remarks at the time of storage (for example, "refrigerated storage").

FIG. 8 is a table illustrating an example of table configuration of the stored article information DB. The stored article information DB 1206 in this example includes a rack number, an article name, and remarks at the time of storage. The information recorded on the stored article information DB may be different from what is illustrated in FIG. 8. For example, information such as the number of articles and fragility of an article may be included.

Next, the operations of the transport robot 1002 and the rack robot 1001 are described. First, the operation of the transport robot 1002, when receiving a request to transport an article stored in the rack robot 1001 to a user, is described. At this point, starting time of the operation of each robot is adjusted based on the difference between the movement time of the transport robot 1002 and the withdrawal time of the rack robot 1001.

Figure 9:
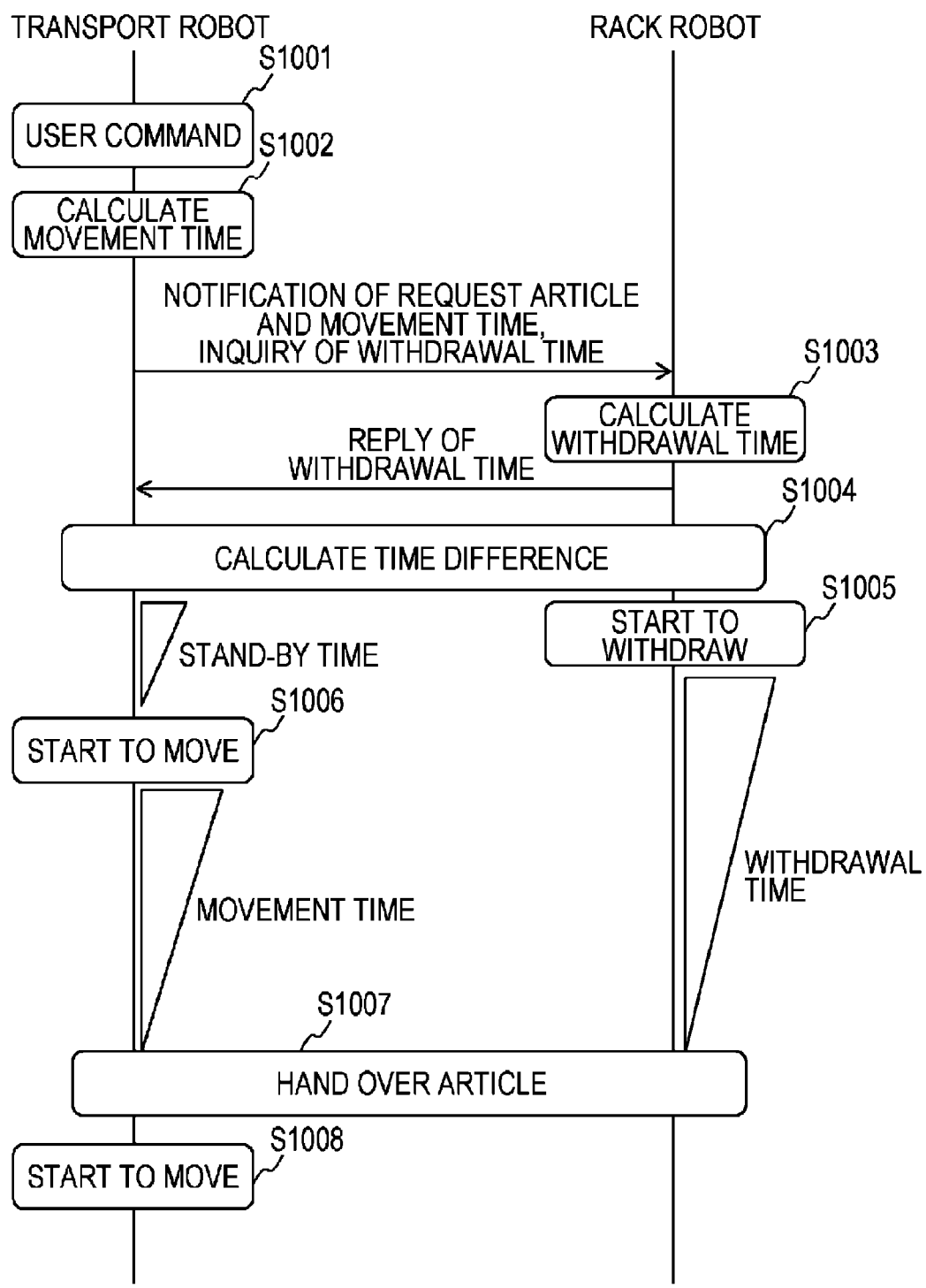
FIG. 9 is a sequence diagram illustrating the operation of the transport robot 1002 and the rack robot 1001 when a movement time of the transport robot is shorter than a withdrawal time of the rack robot.

FIG. 9 is a sequence diagram illustrating the operation of the transport robot 1002 and the rack robot 1001 in the case where the movement time is shorter than the withdrawal time.

First, the transport robot 1002 receives a command to bring an article stored in the rack robot 1001 from a user (step S1001). Then, the transport robot 1002 calculates a movement time taken to arrive at the rack robot 1001 from the current position (step S1002). Next, the transport robot 1002 transmits the information on an article requested by a user to the rack robot 1001 and inquiries about the time taken to withdrawal the target article. At this point, the transport robot 1002 also transmits the movement time calculated in step S1002.

Upon receiving a notification of a transport request, the rack robot 1001 calculates a withdrawal time (step S1003). Subsequently, the rack robot 1001 transmits information indicating a withdrawal time to the transport robot 1002. The transport robot 1002 compares the withdrawal time with its movement time and calculates the time difference (step S1004). Similarly, the rack robot 1001 also compares the movement time with its withdrawal time and calculates the time difference.

In this sequence example, the withdrawal time is longer than the movement time. For this reason, the transport robot 1002 is on stand-by near the user for a time period corresponding to the difference between those times. The transport robot 1002 stays near the user as long as possible, thereby quickly coping with an instruction error or change of mind of the user. In addition, staying of the transport robot 1002 near the user longer time allows the level of sound picked up by a microphone to be maintained at a sufficiently high level. Therefore, accuracy of voice recognition may be increased.

While the transport robot 1002 is on stand-by, the rack robot 1001 starts withdrawal processing of moving an article from the rack 1008 to the hand-over section 1003 (step S1005). When a stand-by time has elapsed, the transport robot 1002 starts to move, the stand-by time being obtained by subtracting the movement time of the transport robot 1002 from the withdrawal time (step S1006). Thus, the rack robot 1001 completes the withdrawal, and the transport robot 1002 arrives in front of the hand-over section at almost the same time when hand over preparation is ready. When the transport robot 1002 arrives, an article is handed over (step S1007). Upon receiving the article, the transport robot 1002 starts to move again and delivers the article to the user (step S1008).

Thus, in the example illustrated in FIG. 9, the rack robot 1001 and the transport robot 1002 mutually transmit their operation times to each other, and the transport robot 1002 stays near the user as long as possible for a time period corresponding to the time difference. In this manner, change of request by a user may be quickly coped with and convenience may be improved.

Figure 10:
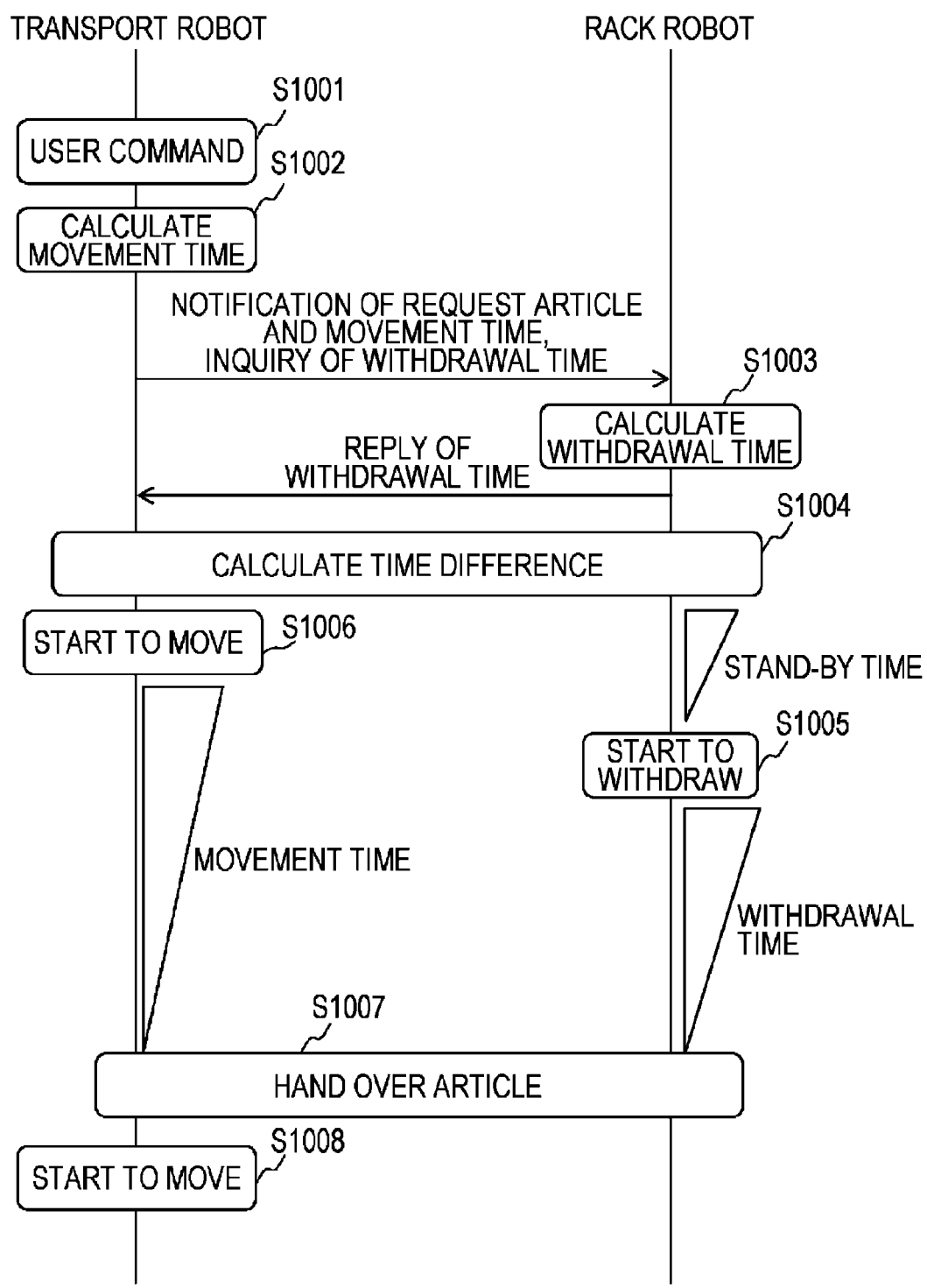
FIG. 10 is a sequence diagram illustrating the operation of the transport robot 1002 and the rack robot 1001 when a movement time of the transport robot is longer than a withdrawal time of the rack robot.

FIG. 10 is a sequence diagram in the case where the withdrawal time is shorter than the movement time. A description of the matter in common with FIG. 9 is omitted. In this example, the withdrawal time is shorter than the movement time, and thus the rack robot 1001 is on stand-by for a time period corresponding to the difference between those times. That is, the starting time (S1005) of withdrawal of the rack robot 1001 is later than the starting time (S1006) of transport of the transport robot 1002. When the stand-by time is adjusted to the difference between the movement time and the withdrawal time, the rack robot 1001 completes the withdrawal at almost the same time when the transport robot 1002 arrives in front of the hand-over section 1003.

Thus, in the example illustrated in FIG. 10, the rack robot 1001 and the transport robot 1002 mutually transmit their operation times to each other, and the rack robot 1001 delays the start of withdrawal processing by a time period corresponding to the time difference. Accordingly, since a notification of a request from transport robot 1002 can be received as for a long time as possible, convenience can be improved. In addition, in the case where a user makes a request to change or cancel an article to be transported while the rack robot 1001 is on stand-by, possibility of wasteful operation may be reduced. Consequently, risk of damage and waste of power consumption, which might occur along with movement of an article, may be reduced.

Next, the more detailed operations of the transport robot 1002 and the rack robot 1001 are described.

Figure 11:
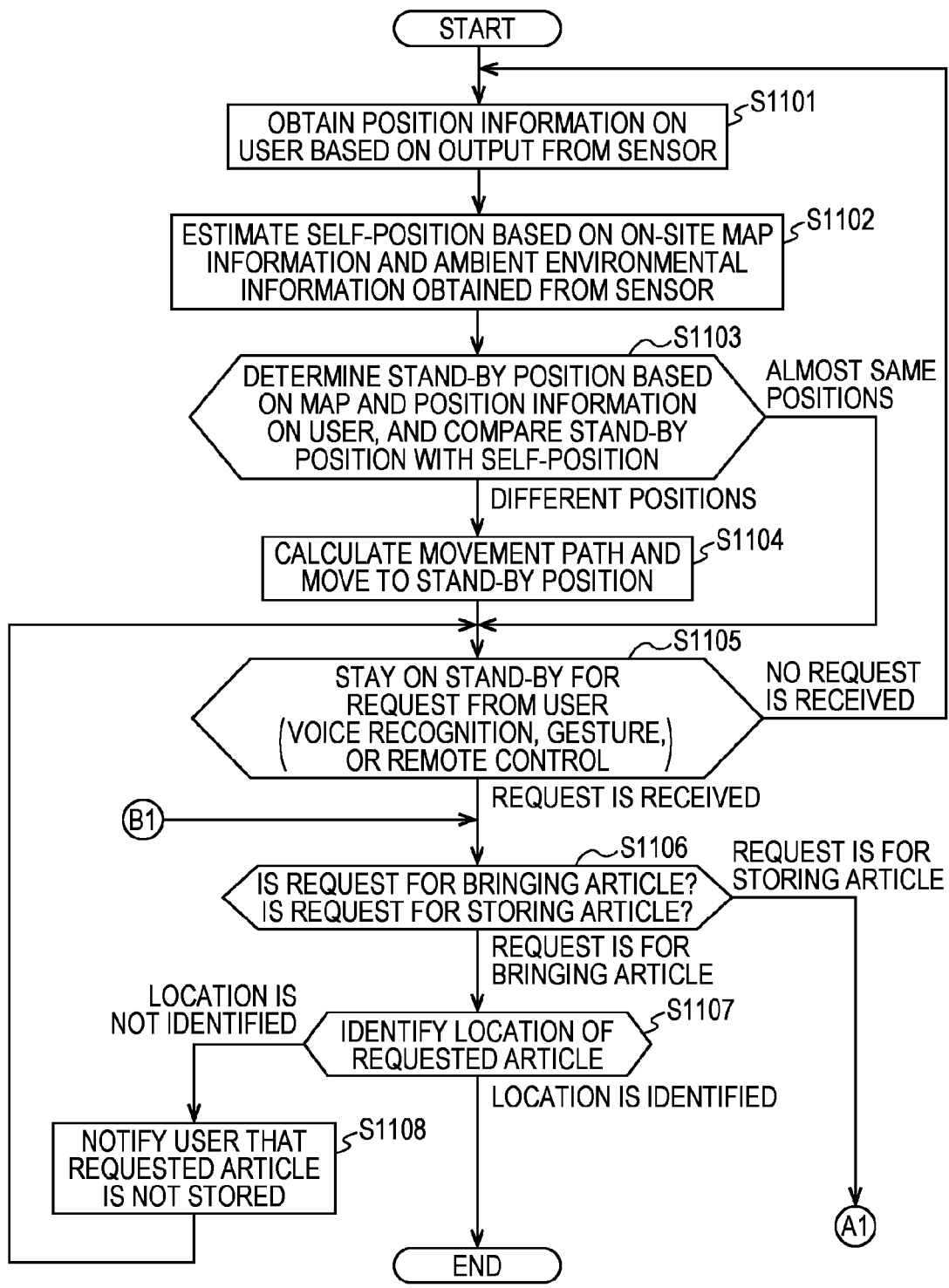
FIG. 11 is a flow chart illustrating the processing performed by the transport robot 1002 that moves to the vicinity of a user and receives a request from the user.

FIG. 11 is a flow chart illustrating the processing performed by the transport robot 1002 that moves to the vicinity of a user and receives a request from the user. Hereinafter, the operations in steps are described sequentially.

(S1101) The user position estimation unit 1101 obtains the position information on a user based on the information outputted from the distance image sensor 1100. Here, instead of using the distance image sensor 1100, a sensor or a camera provided externally of the transport robot 1002 may be used. For example, user position information may be also obtained from a wearable device of a user, a sensor of a smart phone, and a camera mounted on a television. In this case, the transport robot 1002 receives and uses the user position information from such an external sensor.

(S1102) The self-position estimation unit 1107 estimates the position of itself based on the on-site map information and surrounding environment information (for example, point cloud) obtained from a sensor. For estimation of the self-position, a known technology such as the SLAM mentioned above may be used.

(S1103) The movement path calculation unit 1109 calculates a waiting position based on the map and the position information on the user, and compares the waiting position with the self-position. When the comparison result indicates both are at almost the same positions, the flow proceeds to step S1105. When the comparison result indicates both are different positions, the flow proceeds to step S1104.

(S1104) The movement path calculation unit 1109 calculates a movement path to a waiting position, and the movement control unit 1105 commands the movement mechanism 1028 to moves to the waiting position. As described above, a path search algorithm such as the A* algorithm or Dijkstra's algorithm may be used for calculation of a movement path.

(S1105) The input interface 1022 waits for a transport request from a user. In this step, an interaction with a user may be performed in coordination with (remote control such as) voice recognition unit, gesture recognition, or a smart phone. When no request is made, the flow returns to step S1101 and the self-position is adjusted. When a request is made, the flow proceeds to step S1106.

(S1106) The request reception unit 1102 determines whether the received request is for bringing an article or storing an article. When the request is for storing an article, the flow proceeds to processing A1 illustrated in FIG. 23. When the request is for bringing an article, the flow proceeds to step S1107.

(S1107) The request reception unit 1102 identifies the location of the requested article by inquiring of the rack robot 1001. The rack robot 1001 refers to the stored article information DB 1207 to determine the presence of the requested article and notifies the transport robot 1002 of a result. In this step, instead of using the stored article information DB 1207, a common storage on the cloud may be used or the transport robot 1002 may have a copy of management information internally to simplify processing. When the location of the requested article is not identified, the flow proceeds to step S1108.

(S1108) The request reception unit 1102 notifies the user via the speaker 1120 that the rack robot 1001 does not store the requested article. The notification may not be a sound notification using the speaker 1120 but may be a message notification using a display.

Figure 12:
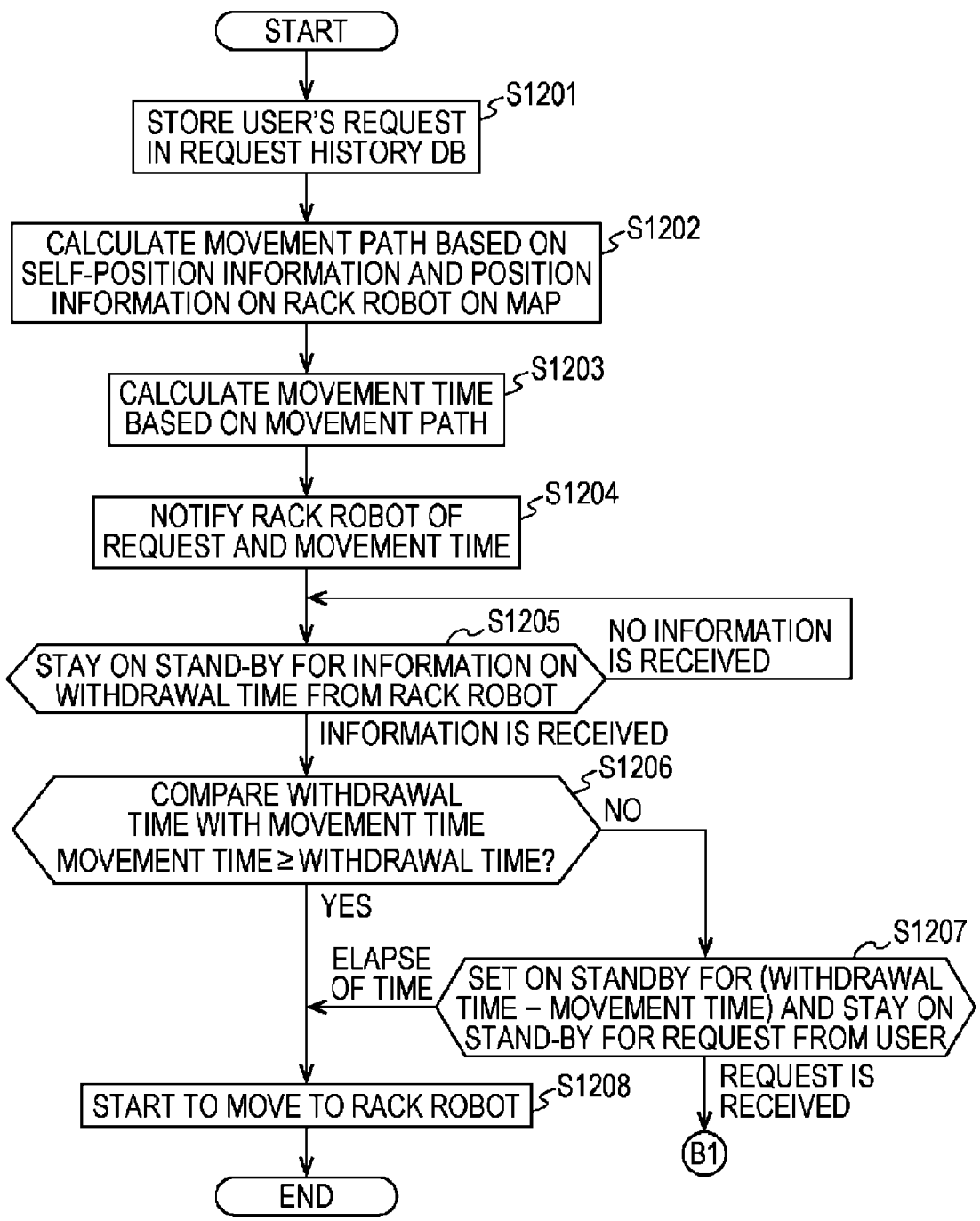
FIG. 12 is a flow chart illustrating the processing performed by the transport robot 1002 that notifies the rack robot 1001 of the request from the user and starts to move.

In step S1107, when the location of the requested article is identified, the processing is exited, and the flow proceeds to the processing illustrated in FIG. 12.

FIG. 12 is a flow chart illustrating the processing performed by the transport robot 1002 that notifies the rack robot 1001 of the request from the user and starts to move. Hereinafter, the operations in steps are described sequentially.

(S1201) The request reception unit 1102 stores information indicating the content of the request of the user in the request history DB 1103. The information stored includes, for example, ID, the name of the requested article, the position where the request is received, the position of the user, and information indicating the state of the user.

(S1202) the movement path calculation unit 1109 calculates a movement path based on self-position information and the position information on the rack robot 1001 on the map. As described above, a path search algorithm such as the A* algorithm or Dijkstra's algorithm may be used for calculation of a movement path.

(S1203) The movement time comparison determination unit 1106 calculates a movement time based on the calculated movement path. In this step, a movement time may be calculated based on the assumption that the movement speed is constant or on the assumption that a movement speed changes according to a situation. For example, the movement speed may be changed according to the characteristic of the floor surface on the path or according to the fragility of the article to be transported.

(S1204) The first communication circuit 1026 notifies the rack robot 1001 of information indicating the content of the request and information indicating the movement time.

(S1205) The first communication circuit 1026 is on stand-by for information on withdrawal time from the rack robot 1001. When no information is received, the first communication circuit 1026 continues to be on stand-by, and when information is received, the flow proceeds to step S1206.

(S1206) The movement time comparison determination unit 1106 compares the withdrawal time with its movement time and determines whether or not the movement time is greater than or equal to the withdrawal time (movement time≥withdrawal time). When the determination result is YES, the flow proceeds to the processing in step S1208, and when the determination result is NO, the flow proceeds to the processing in step S1207.

(S1207) The transport robot 1002 waits for a time period corresponding to the difference (withdrawal time−movement time) between the movement time and the withdrawal time without moving, and is on stand-by for a further request from the user. In this step, the user may be informed that a request of the user is properly received. For example, a mark indicating that the rack robot 1001 is in operation may be displayed on a display or sound indicating completion of reception may be outputted from a speaker. In this manner, anxiety of the user as to whether a request of the user is properly received may be eliminated. In step S1207, when no further request is made, the flow proceeds to the processing in step S1208. When a request is made, the flow proceeds to B1 illustrated in FIG. 11, and the processing subsequent to step S1106 is performed again. Upon receiving a new request, the transport robot 1002 updates the last request with the new request. The new request may be a request of cancellation. When a new request is made, the rack robot 1001 stops the operation which was started by the last request, and starts an operation for satisfying the new request.

(S1208) The movement mechanism 1028 starts to move toward the rack robot 1001. The movement is performed along a path calculated by the movement path calculation unit 1109. The movement speed may be changed according to the condition of the floor surface and the characteristic of the article to be transported.

Figure 13:
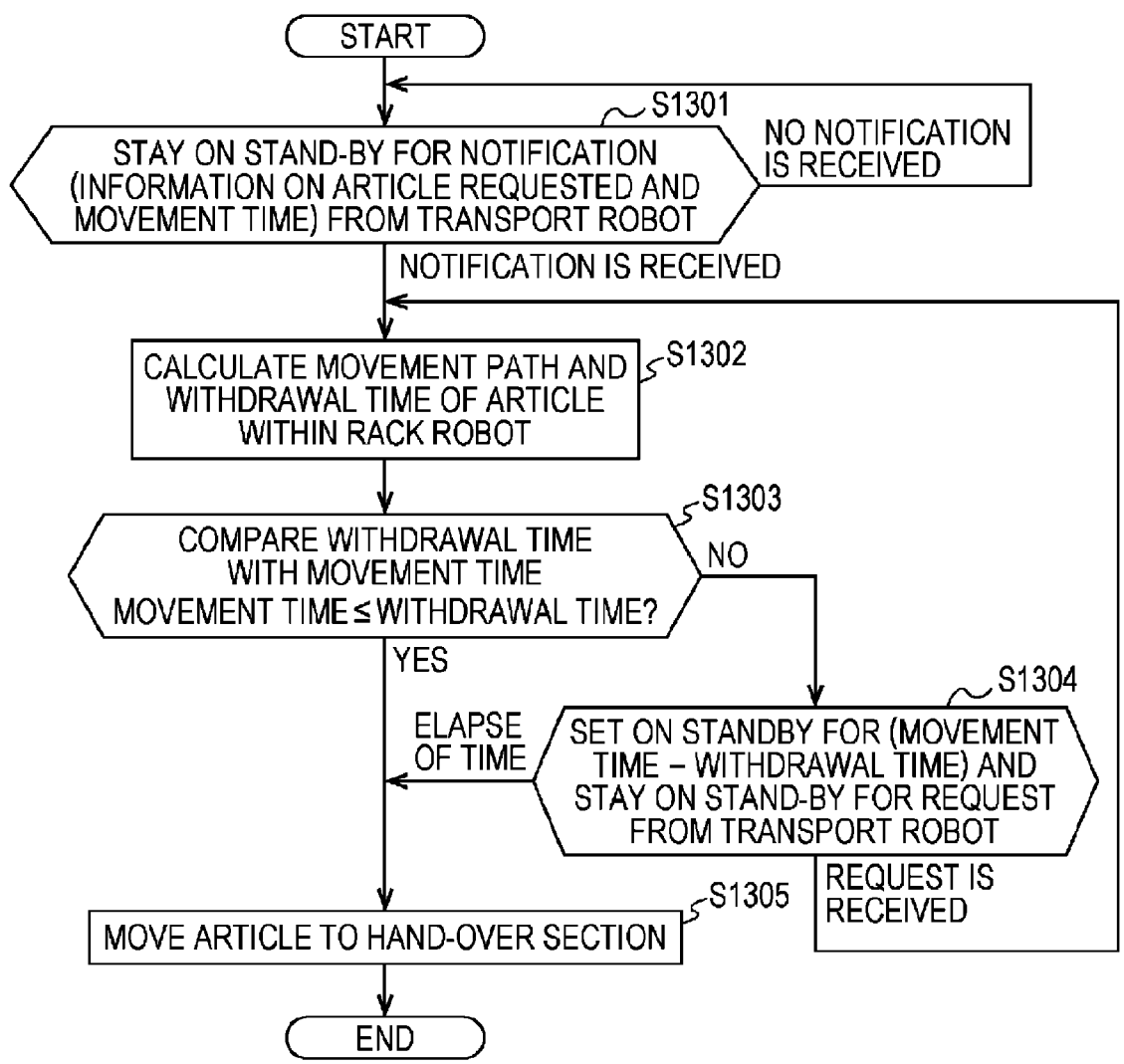
FIG. 13 is a flow chart illustrating the processing performed by the rack robot 1001 that receives a command from the transport robot 1002 and withdraws an article.

FIG. 13 is a flow chart illustrating the processing performed by the rack robot 1001 that receives a command from the transport robot 1002 and withdraws an article. Hereinafter, the operations in steps are described sequentially.

(S1301) The second communication circuit 1046 is on stand-by for a notification (an article on a transport request from the user and information on the movement time) from the transport robot 1002. When no information is received, the second communication circuit 1046 continues to be on stand-by, and when information is received, the flow proceeds to step S1302.

(S1302) The withdrawal time calculation unit 1204 determines a movement path from the location of the article requested by the user to the hand-over section 1003 within the rack robot 1001, and calculates a time taken to withdraw the article, that is, a withdrawal time. The location of the requested article may be identified from the information stored in the stored article information DB1207. The withdrawal time may be calculated from the distance between the location of the article requested by the user and the hand-over section 1003, and the movement speed of the conveyor mechanism 1048. The movement speed may be determined according to the characteristics (such as risk of falling or slanting) of the requested article.

(S1303) The withdrawal time comparison determination unit 1205 compares the withdrawal time with the movement time of the transport robot 1002, and determines whether or not the withdrawal time is greater than or equal to the movement time (movement time≤withdrawal time). When the determination result is YES, the flow proceeds to step S1305. When the determination result is NO, the flow proceeds to step S1304.

(S1304) The rack robot 1001 waits for a time period corresponding to the difference (movement time−withdrawal time) between the movement time and the withdrawal time without moving, and is on stand-by for a further request from the transport robot 1002. When a request is made, the flow proceeds to B1 and performs the processing in step S1302 again. When the time elapses without receiving a request, the flow proceeds to step S1305.

(S1305) The drive control unit 1202 and the conveyor mechanism 1048 move a target article to the hand-over section 1003.

As described above, when the withdrawal time of the rack robot 1001 is shorter than the movement time of the transport robot 1002, the rack robot 1001 waits for start of processing for a time period corresponding to the time difference between the movement time and the withdrawal time. In this manner, the effect is achieved that change of request or cancellation by a user may be quickly coped with. In addition, since wasteful operation may be avoided, assured safety of article and reduction in power consumption may be achieved.

The stand-by time of the transport robot 1002 and the rack robot 1001 does not have to strictly match the difference between the movement time and the withdrawal time. Any stand-by time in relation to the difference between these times may be properly set. Communication between the transport robot 1002 and the rack robot 1001 may be directly made using a communication system such as a wireless LAN, or made via a cloud server on the Internet. Such a cloud server may store at least one of the request history DB 1103, the on-site map DB 1110, and the stored article information DB1207.

In the present embodiment, both the transport robot 1002 and the rack robot 1001 make comparison between times and determination as to stand-by. However, either one of the transport robot 1002 and the rack robot 1001 may perform this processing.

Figure 14:
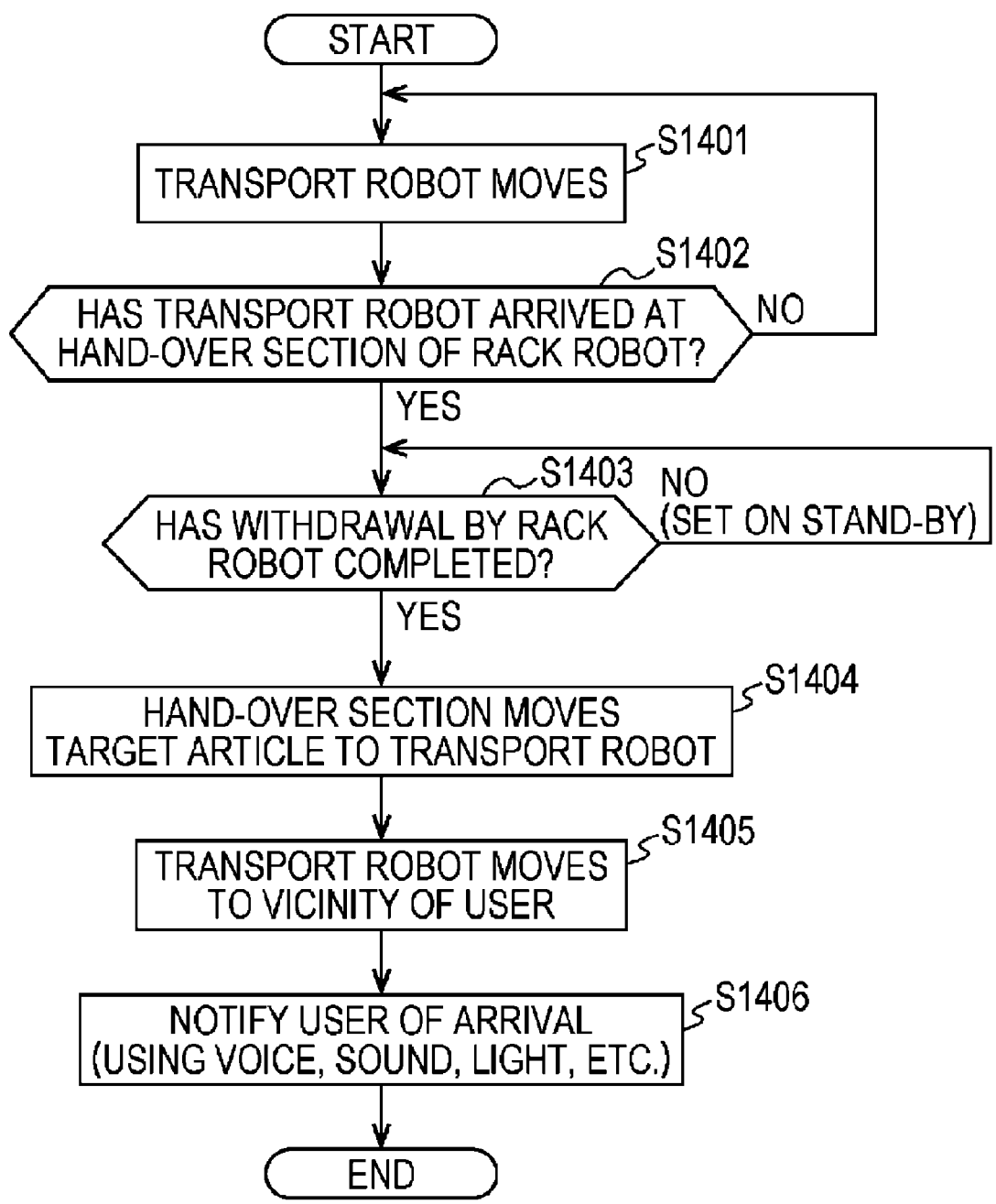
FIG. 14 is a flow chart illustrating the processing performed by the transport robot 1002 that moves to the rack robot 1001 to receive an article and returns to the user.

FIG. 14 is a flow chart illustrating the processing performed by the transport robot 1002 that moves to the rack robot 1001 to receive an article and returns to the user. Hereinafter, steps are described sequentially.

(S1401) The transport robot 1002 starts to move towards the rack robot 1001. In this step, the transport robot 1002 moves along the path which is determined by the movement path calculation unit 1109. During the movement, change in the conditions of the path may be detected and the path may be changed.

(S1402) The rack robot 1001 determines whether or not the transport robot 1002 has arrived in front of the hand-over section 1003. The determination may be made, for example, by a sensor (not illustrated) provided in the rack robot 1001. The sensor, when detecting that the transport robot 1002 is in front of the hand-over section 1003, determines that the transport robot 1002 has arrived. When the transport robot 1002 has not arrived, the transport robot 1002 continues to move and the rack robot 1001 continues to attempt to detect. When the transport robot 1002 has arrived, the flow proceeds to step S1403.

(S1403) The transport robot 1002 determines whether or not withdrawal by the rack robot 1001 has completed. The determination may be made, for example, by detecting the presence of the target article at the hand-over section 1003 by the distance image sensor 1100. When the withdrawal is not completed, the transport robot 1002 is on stand-by at the hand-over section 1003. When the withdrawal is completed, the flow proceeds to step S1404.

(S1404) The conveyor mechanism 1048 causes the transport robot 1002 to move to the target article. The transport robot 1002 detects that the target article is placed at its hand-over section (a hollow provided in the chest of the transport robot 1002 in the example illustrated in FIGS. 1A and 1B), for example by a sensor which is not illustrated. Such a sensor may be, for example, an infrared sensor, an image sensor, or a weight sensor.

(S1405) The transport robot 1002 moves to the vicinity of the user. The path in this step may be the same as or different from the path along which the transport robot 1002 has moved to the rack robot 1001. Since the positions of movable objects and users may be different from those when the transport robot 1002 moved to the rack robot 1001, searching for a movement path again achieves more reliable operation.

(S1406) The transport robot 1002, when arriving at the vicinity of the user, notifies the user of the arrival. The notification may be made, for example, by voice or sound from a speaker, a display, or light from an indicator.

In this manner, the present embodiment achieves transport of article with effective use of time while keeping confusion in the interaction with a user to a minimum.

Next, an example of a method of calculating a movement time by the transport robot 1002 is described.

Figure 15:
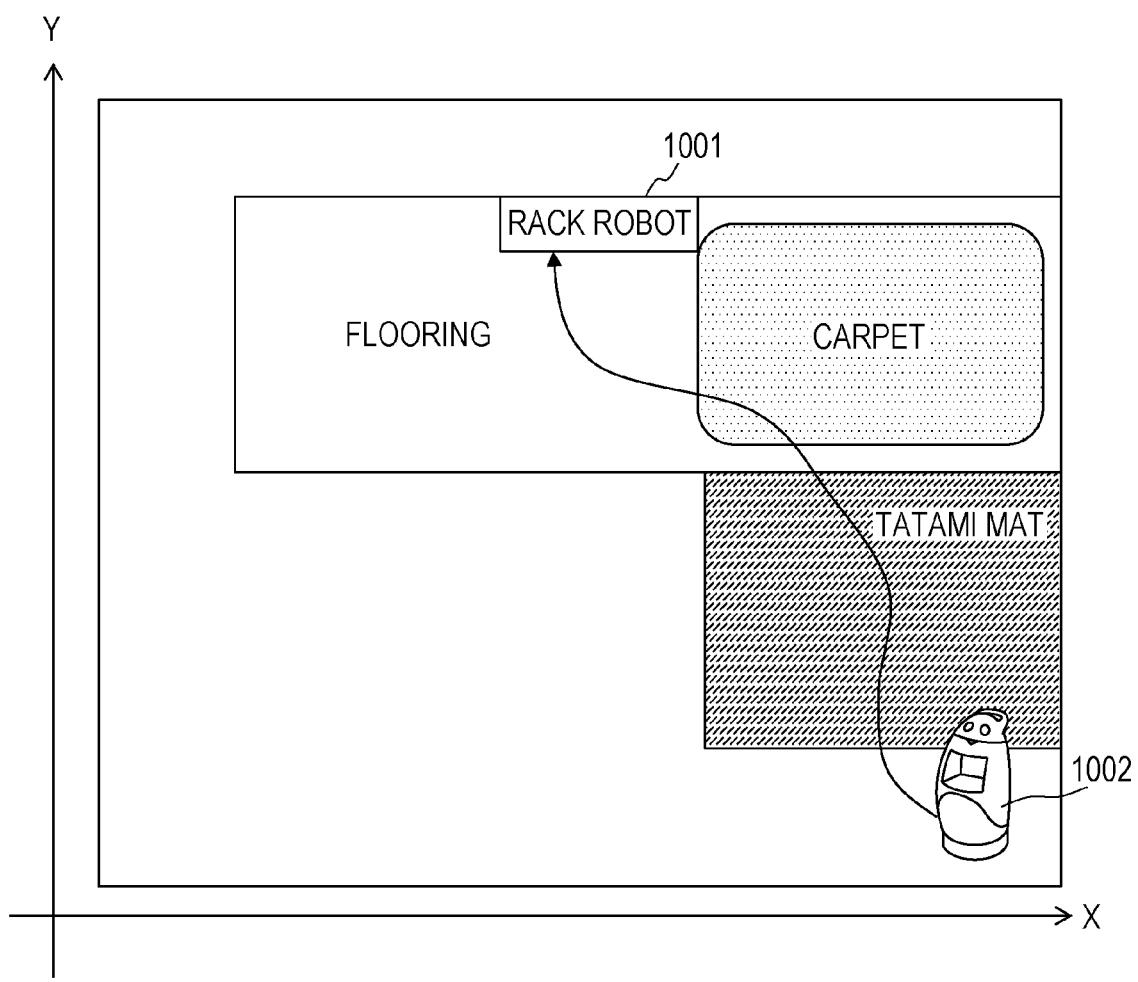
FIG. 15 is an illustration depicting an example of a movement path of the transport robot 1002 and an example of floor types on the movement path.

FIG. 15 is an illustration depicting an example of a movement path of the transport robot 1002 and an example of floor types (such as tatami mat, flooring, carpet) on the movement path. FIG. 16 is a diagram illustrating a table that stores surface roughness, presence of other robots, and presence of other persons, animals for each type of floor. The transport robot 1002 stores information as illustrated in FIG. 16 along with the on-site map described above. The transport robot 1002 improves the accuracy of calculation of a movement time by combining such information and surrounding environment recognition. For the calculation of a movement time, possible obstructive factors to movement are considered such as surfaces roughness patterns due to different floor patterns, presence of animals such as a pet and other persons such as a family member, and presence of other robots. In particular, risk of falling and vibration of an article transported is preferably taken into consideration, the risk being caused by movable objects in the surrounding.

FIG. 17 is a table illustrating that risk of falling, allowable vibration, the moving speed in the rack robot 1001 and the moving speed of the transport robot 1002 are different depending on a transport article. In the example illustrated, scissors and mobile phones have relatively low risk of falling, and so allowable vibration is large. Cups have medium risk of falling, and so allowable vibration is medium. Beer has high risk of falling, and so allowable vibration is small. Such information is stored in the recording medium 1025 as a list for each article.

Thus, the risk of falling and allowable vibration during movement of an article are different according to the type of the article. Thus, the transport robot 1002 and the rack robot 1001 change the method of calculating a movement speed according to an article to be transported and the relationship with the surrounding environment such as a surface roughness, the presence of movable objects illustrated in FIG. 16.

Figure 18:
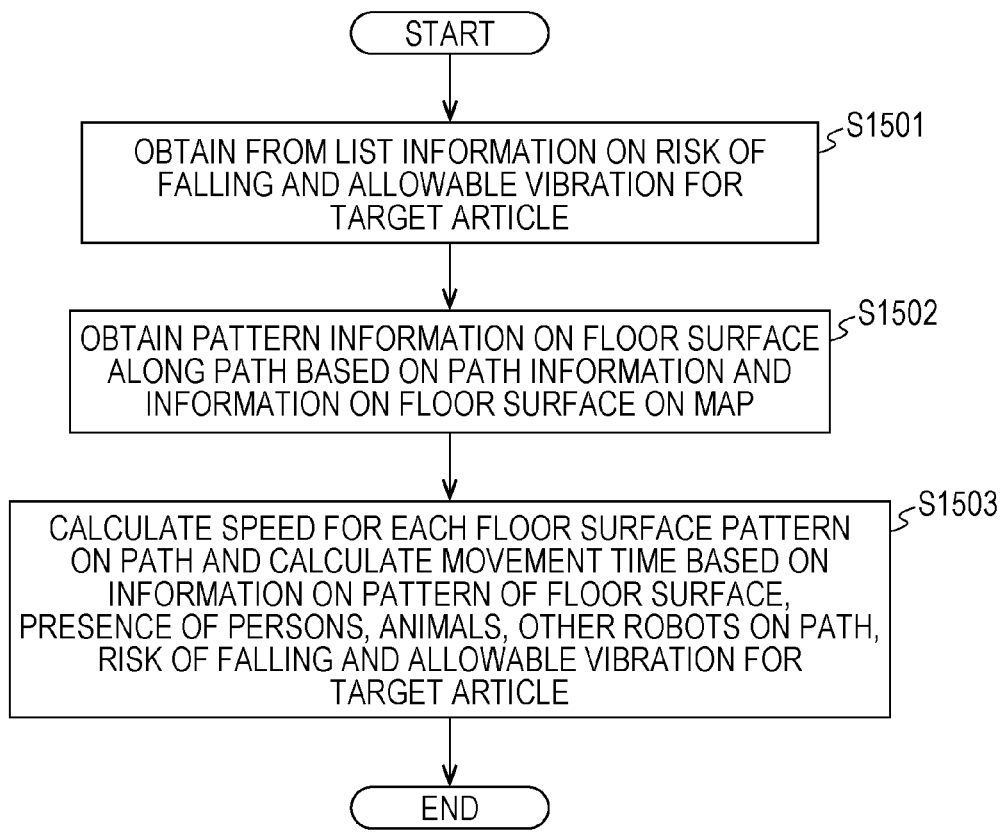
FIG. 18 is a flow chart illustrating the flow of the process of calculating a movement time by a movement path calculation unit 1109 in the transport robot 1002.

FIG. 18 is a flow chart illustrating the flow of the process of calculating a movement time by the movement path calculation unit 1109 in the transport robot 1002. Hereinafter, processing steps are described sequentially.

(S1501) Obtain information on the risk of falling and allowable vibration of the target article from the list.

(S1502) Obtain information on patterns of the floor on the path from path information and floor information on the map.

(S1503) Calculate a speed for each floor pattern on the path based on the pattern of the floor, the presence of persons, animals, other robots on the path, and the risk of falling and allowable vibration of the target article, then determines a movement time.

Hereinafter, an example of a calculation expression for determining a movement speed is described. In the present embodiment, a deceleration parameter K, which is determined by an article to be transported and the surrounding environment, is first calculated, then a movement speed is determined by multiplying a predetermined maximum speed by the reciprocal of the deceleration parameter K. That is, the movement speed is determined by the following expressions:

movement speed=maximum speed×1/$K$

The deceleration parameter K is determined by the following expression:

deceleration parameter($K$)=1+presence of other robots×risk of falling+presence of other persons,animals×risk of falling+floor roughness× allowable vibration Here, the risk of falling, allowable vibration, and floor roughness are expressed, for example, in terms of 3 step levels (high, medium, low), where 2 is substituted for "high", 1 is substituted for "medium", and 0 is substituted for "low". Regarding the presence of other robots and the presence of other persons, animals, 1 is substituted for "presence" and 0 is substituted for "non-presence". The movement time is calculated by dividing the movement distance by the movement speed.

In this manner, an amount of deceleration from the maximum speed is adjusted according to a transport article and the surrounding environment, thereby making it possible to transport an article to a user in a safe and speedy manner. Furthermore, the movement time and effective stand-by time are computable based on the movement speed calculated in this manner.

The method of calculating a movement speed is not limited to the above-described method. For example, the deceleration parameter may be calculated using a different calculation expression from the above expression. Alternatively, the movement speed may be determined with reference to a table that defines the correspondence relationship between movement speeds and the surrounding environment conditions.

Figure 19:
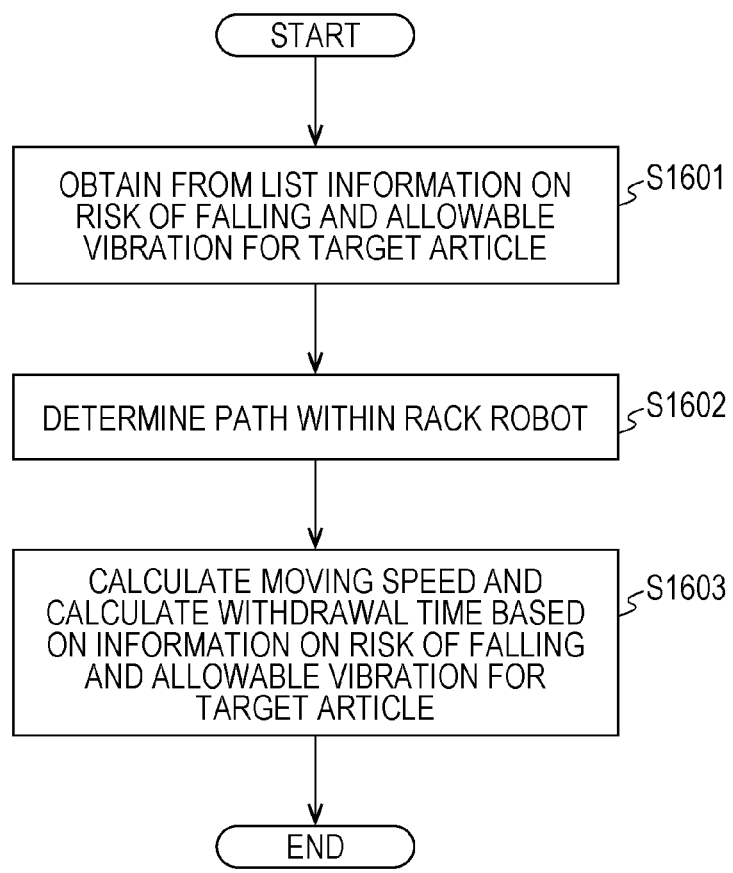
FIG. 19 is a flow chart illustrating the process of calculating a withdrawal time by a withdrawal time calculation unit 1204 in the rack robot 1001.

FIG. 19 is a flow chart illustrating the process of calculating a withdrawal time by the withdrawal time calculation unit 1204 in the rack robot 1001. Hereinafter, processing steps are described sequentially.

(S1601) Obtain the risk of falling and allowable vibration of the target article from the list. The information of the list may be obtained from the transport robot 1002, or the recording medium 1045 in the track robot 1001 may store the information of the list.

(S1602) Determine a path within the rack robot 1001. The path may be, for example, a linear path from the storage position of the article on a transport request to the hand-over section 1003. In the case where the conveyor mechanism 1048 has a structure that allows only horizontal or vertical movement at a time, the path may have a length of the sum of the horizontal distance and vertical distance between the storage position and the hand-over section 1003. A method of determining a path within the rack robot 1001 is not limited to a particular method.

(S1603) Calculate a movement speed from the information on the risk of falling and allowable vibration of the target article using a predetermined calculation expression, then calculate a withdrawal time. The movement speed may be determined, for example, to a value which is obtained by multiplying a predetermined maximum speed by the reciprocal of the deceleration parameter K. That is, the movement speed is determined by the following expressions:

movement speed=maximum speed×1/$K$

The deceleration parameter K in this case may be calculated, for example, by the following expression:

deceleration parameter($K$)=1+1×risk of falling+0.5× allowable vibration

Where "risk of falling" and "allowable vibration" may be numerical values such as high=2, medium=1, and low=0 as described above. However, the method of determining a movement speed within the rack robot 1001 is not limited to this example.

In this manner, a movement speed of an article within the rack robot 1001 is determined in consideration of the risk of falling and allowable vibration of the target article, thereby enabling the article to be moved in a safe and speedy manner. A withdrawal time is estimated based on the movement speed determined in this manner, thereby enabling effective stand-by time to be calculated.

Next, the operation of arranging the allocation of stored articles within the rack robot 1001 in advance in a preferable manner according to the state of a user is described. The operation is performed before a transport request is received from a user (for example, when the transport robot 1002 arrives at the vicinity of a user upon responding to a call from the user).

Figure 20:
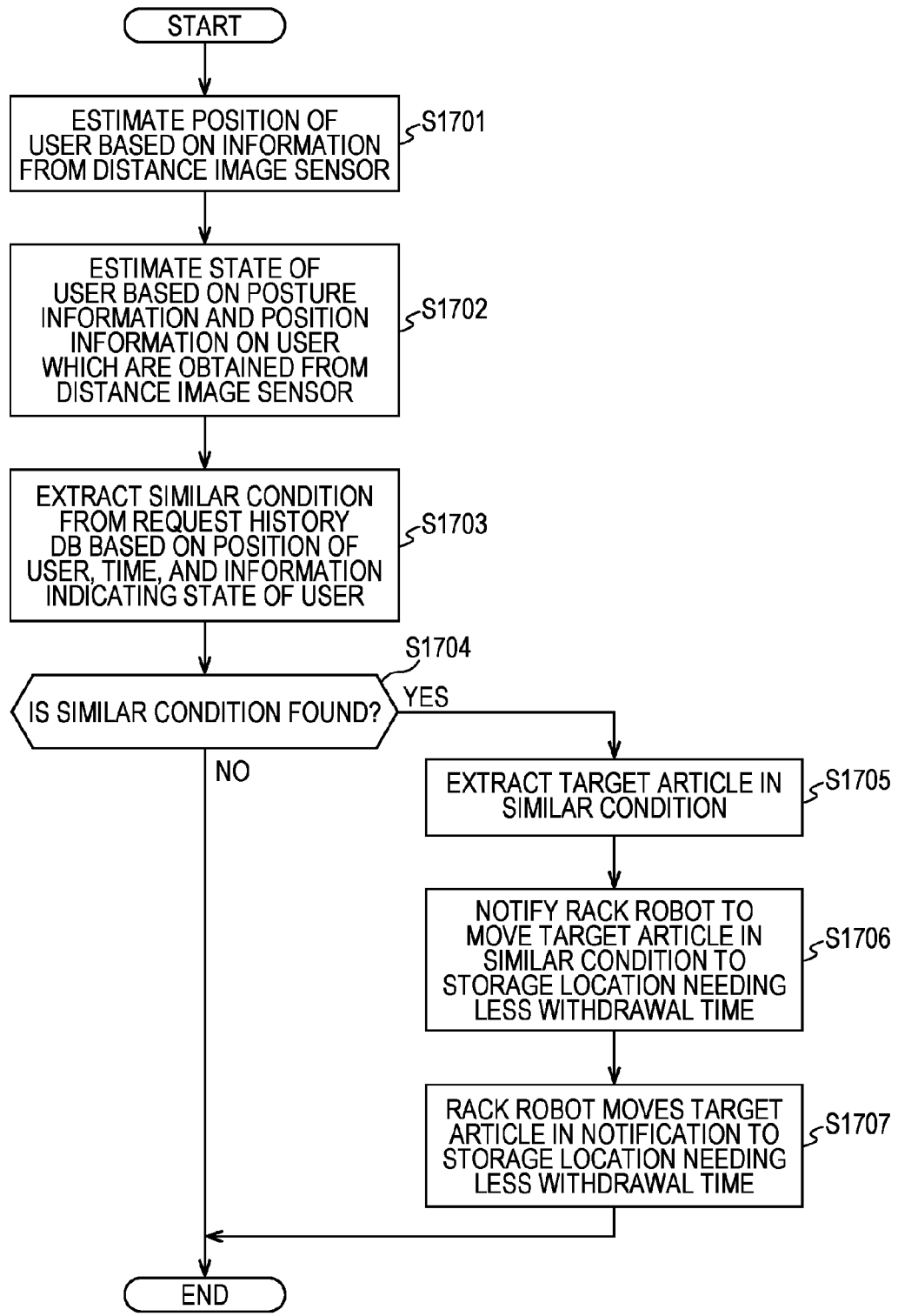
FIG. 20 is a flow chart illustrating the process of changing internal arrangement of stored articles in the rack robot 1001 based on information which is obtained by the transport robot 1002 and which indicates the position and state of a user.

FIG. 20 is a flow chart illustrating the process of changing internal arrangement of stored articles in the rack robot 1001 based on information which is obtained by the transport robot 1002 and which indicates the position and state of a user. Hereinafter, steps are described sequentially.

(S1701) The user position estimation unit 1101 estimates the position of a user based on the information obtained from the distance image sensor 1100.

(S1702) The user action estimation unit 1108 estimates the state of the user based on the information indicating the state (such as posture, expression) of the user and the position information on the user, obtained from the distance image sensor 1100.

(S1703) The request reception unit 1102 extracts a similar condition from the request history DB 1103 based on the position information on the user, time, and the information indicating the state of the user.

(S1704) The user activity estimation unit 1108 determines whether or not a similar condition is found. When no similar condition is found, the processing is exited, and when a similar condition is found, the flow proceeds to step S1705.

(S1705) The user activity estimation unit 1108 extracts at least one target article in the similar condition. Here, when plural target articles in the similar condition are found, all of the target articles may be notified or one of the target articles, which has the highest frequency may be notified.

(S1706) The request reception unit 1102 notifies the rack robot 1001 via the first communication circuit 1026 to move the target article in the similar condition to a storage location having a shorter withdrawal time, that is, a storage location nearer to the hand-over section 1003.

(S1707) The rack robot 1001 moves the target article in the notification to a storage location having a shorter withdrawal time. For example, one of the racks with no article therein may be selected as a destination storage location, the one being the closest to the hand-over section 1003.

The above operation enables the target article to be quickly moved to the hand-over section 1003, when the target article moved to the vicinity of the hand-over section 1003 is actually requested by a user, thereby enabling the entire operating time to be shortened.

In the present embodiment, the transport robot 1002 includes the distance image sensor 1100. However, such a sensor may be provided externally of the transport robot 1002. Hereinafter, such an example of configuration is described.

Figure 21:
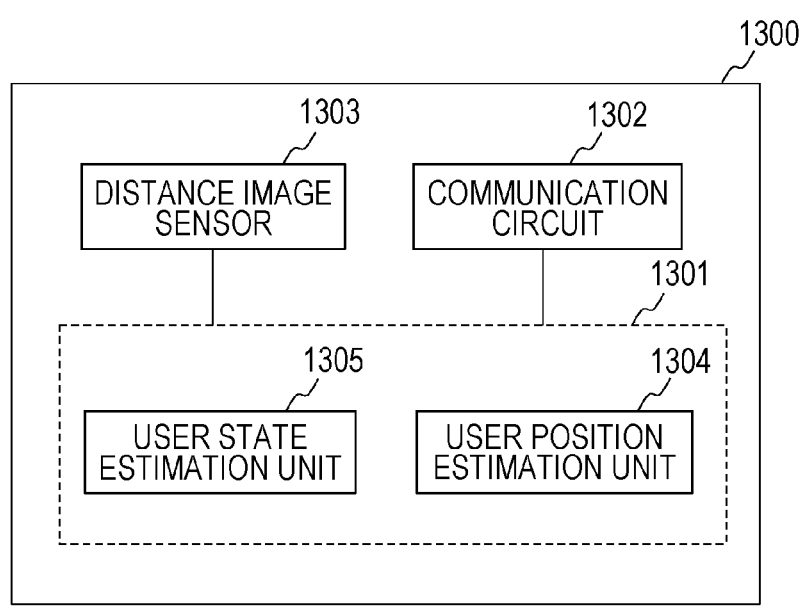
FIG. 21 is a block diagram illustrating a configuration example of a sensor device 1300 provided externally of the transport robot 1002.

FIG. 21 is a block diagram illustrating a configuration example of a sensor device 1300 (hereinafter may be referred to as an "environment side sensor") provided externally of the transport robot 1002. Such an environment side sensor 1300 is installed, for example, on a wall surface or a ceiling, and may be incorporated as part of the rack robot 1001. The environment side sensor 1300 replaces or complements the sensing function of the transport robot 1002 itself.

The environment side sensor 1300 illustrated in FIG. 21 includes a distance image sensor 1303, a communication circuit 1302, and a control circuit 1301. The control circuit 1301 has a user position estimation unit 1304 and a user state estimation unit 1305. The user position estimation unit 1304 estimates the position of a user based on map information obtained via the communication circuit 1302 and distance image information obtained from the distance image sensor 1303. The user position estimation unit 1304 then transmits the information on the position of the user to the transport robot 1002 via the communication circuit 1302. The user state estimation unit 1305 estimates a state of the user based on the distance image information obtained from the distance image sensor 1303. The user state estimation unit 1305 then transmits information indicating the estimated state of the user to the transport robot 1002 via the communication circuit 1302.

With this configuration, the state of a user is estimated and the information is transmitted to the transport robot 1002, thereby enabling the activity of a user to be predicted and preparation of an article to be made in advance. It is to be noted that instead of the distance image sensor 1303, an image sensor or other type of sensor such as a laser range finder may be used.

Next, a configuration example is described in the case where the rack robot 1001 has function of processing of a stored article (mainly food) and working in coordination with a transport company (delivery company).

Figure 22:
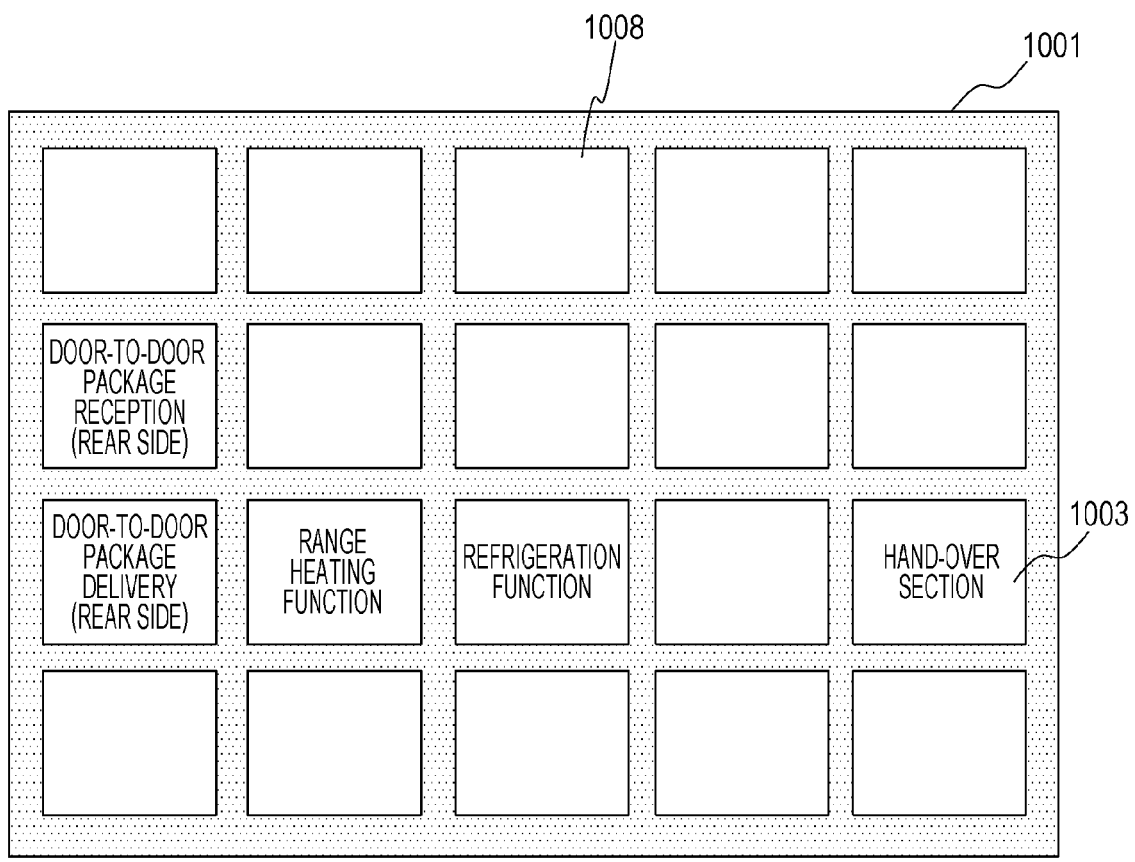
FIG. 22 is a diagram illustrating a configuration example of the rack robot 1001 when part of plural racks 1008 in the rack robot 1001 has functions of processing food and/or working in coordination with a delivery company.

FIG. 22 is a diagram illustrating a configuration example of the rack robot 1001 when part of plural racks 1008 in the rack robot 1001 has functions of processing food and/or working in coordination with a delivery company. In this example, the rack robot 1001 has 20 areas in 4 rows and 5 columns, in which 19 areas are racks 1008 and 1 area is the hand-over section 1003.

In this example, the 2nd row and 1st column is a rack for receiving a door-to-door package, and the 2nd row and 2nd column is a rack for delivering a door-to-door package. These two racks have an openable/closable back side to allow a delivery person to deliver a door-to-door package or pick up a door-to-door package. In order to achieve this function, the rack robot 1001 may be, for example, embedded and installed in the wall of a house. The rack robot 1001 used for this purpose has a relatively large size (for example, the horizontal and vertical lengths are each 1 m to several m). This type of rack is used not only for door-to-door package delivery service but also for service of transporting and storing articles of a user in an external warehouse such as a rental warehouse. For example, the following service is available: after a user places an article in a rack for delivery, the article to be delivered to an external warehouse, a delivery person picks up the article from the rack in predetermined timing and delivers the article to the warehouse where the article is stored. A configuration may be adopted in which the rack robot 1001 collects stored articles, which have not been used for a long time, in the rack for delivery provided that automatic delivery of the stored articles has been requested to a delivery company. In this configuration, out of the articles stored in the plural racks 1008, the conveyor mechanism 1048 moves certain articles to the rack for delivery in advance, the certain articles having a lower frequency of transport request than a predetermined frequency and being included in the articles stored in the racks. The second communication circuit 1046 transmits a delivery request to a server (computer) of a delivery company, the delivery request on the certain articles to be delivered to an external warehouse. The delivery company picks up articles of a delivery request at the user's residence and transports the articles to the external warehouse based on the delivery request transmitted to the server. It is efficient that movement of the article between racks be made at a time when the frequency of request from the user is low.

In the example illustrated in FIG. 22, the rack robot 1001 also has a rack (the 3rd row and 2nd column) having a function of heating a stored article with a microwave, and a rack (the 3rd row and 3rd column) having a function of refrigerating a stored article. Like this, the rack robot 1001 may have racks having functions of heating or refrigerating food and drink. In the present description, "processing" refers to the operation of changing the temperature or pressure of a stored article by an operation including heating and refrigeration.

In this type of rack robot 1001, the second control circuit 1044 estimates the above-described hand-over time (or withdrawal time) by adding a time taken to process a stored article to the movement time. In this step, the time taken to prepare an article varies depending on each function. For example, setting time for heating of a microwave, and a cooling time of a refrigerator each vary depending on a requested article. For this reason, the rack robot 1001 determines a time to be added according to the type of processing. In the case where the rack is a refrigerator, opening-and-closing time of a refrigerator door is added to the processing time.

Next, the operation of transporting an article to the rack robot 1001 by the transport robot 1002 is described.

Figure 23:
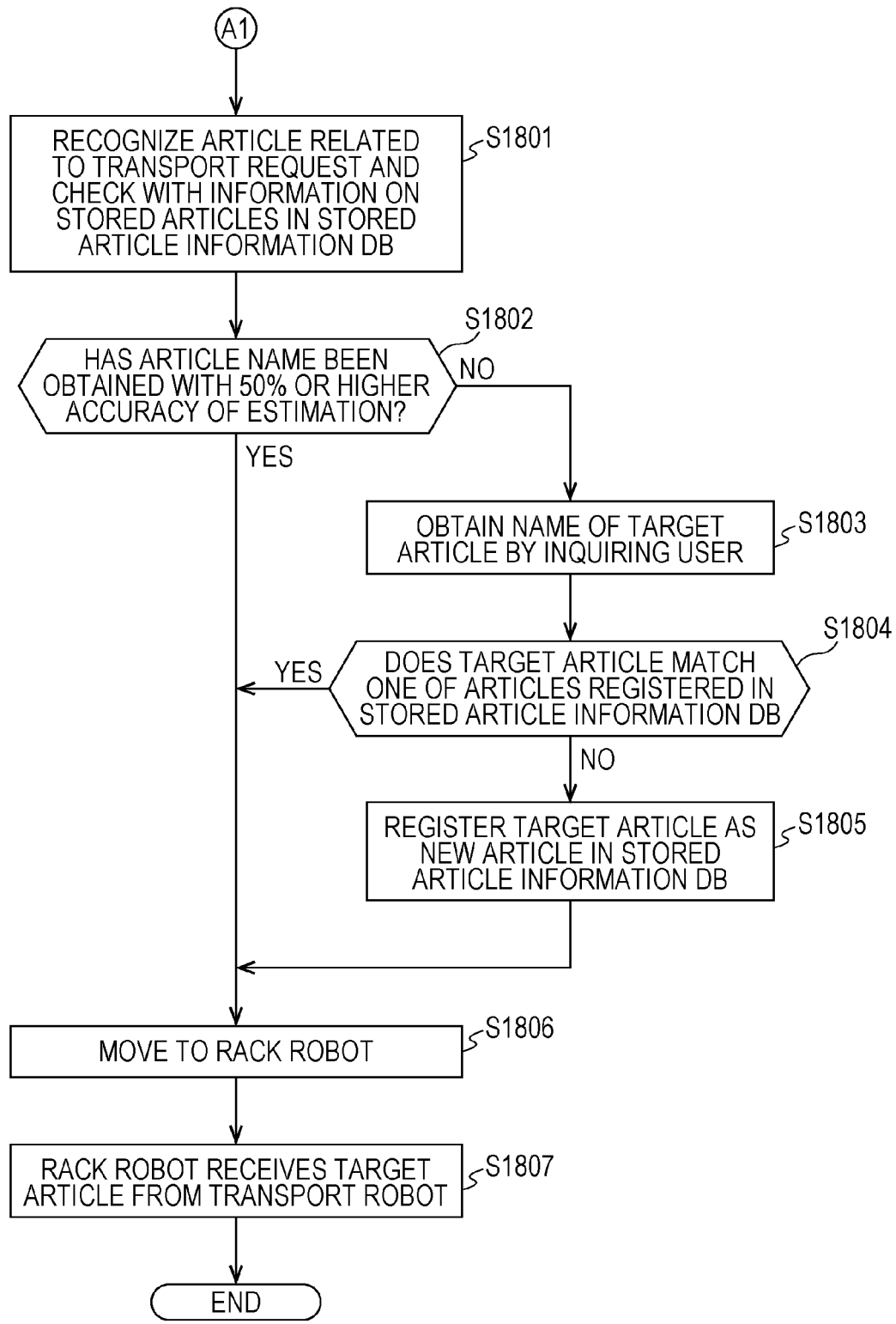
FIG. 23 is a flow chart illustrating the process of transporting an article to the rack robot 1001 by the transport robot 1002 and storing the article by the rack robot 1001 according to a request from a user.

FIG. 23 is a flow chart illustrating the process of transporting an article to the rack robot 1001 by the transport robot 1002 and storing the article by the rack robot 1001 according to a request from a user. This flow chart indicates processing that follows A1 illustrated in FIG. 11. Hereinafter, processing steps are described sequentially.

(S1801) The first control circuit 1024 in the transport robot 1002 recognizes an article on a transport request based on the image information and distance information (3D data) obtained by the distance image sensor 1100. The transport robot 1002 may recognize an article on a transport request when a user is holding the article in the hand or after the article is placed in the storage area of the transport robot 1002. The first control circuit 1024 checks the article on the transport request against accumulated information on articles stored in the stored article information DB 1007 in the rack robot 1001.

(S1802) The first control circuit 1024 determines whether or not an article name has been obtained with an estimation accuracy of 50% or higher as a result of the check. When the estimation accuracy is 50% or higher, the flow proceeds to the processing in step S1806 to store the article. When the estimation accuracy is lower than 50%, the flow proceeds to the processing in step S1803. Although the determination is made with an estimation accuracy of 50% or higher herein, this is only an example. For example, the determination may be made with an estimation accuracy of 70% or higher.

(S1803) The first control circuit 1024 obtains the name of the target article by inquiring of a user. For example, the first control circuit 1024 inquires of a user for the name of the target article by sound or display on a screen. The user inputs the name of a target article to the transport robot 1002 by sound, character input, or selection from the displayed candidates.

(S1804) The first control circuit 1024 determines whether or not the inputted article name matches one of the article names registered in the stored article information DB 1007. When one of the registered article names is determined to be matched, the flow proceeds to step S1806, otherwise, the flow proceeds to step S1805.

(S1805) The first control circuit 1024 commands the rack robot 1001 to register the article on the transport request as a new article in the stored article information DB 1007. In response to the command, the second control circuit 1044 in the rack robot 1001 adds the information on the article to the stored article information DB 1007.

(S1806) The transport robot 1002 moves to the rack robot 1001.

(S1807) The rack robot 1001 receives the target article from the transport robot 1002.

Figure 24:
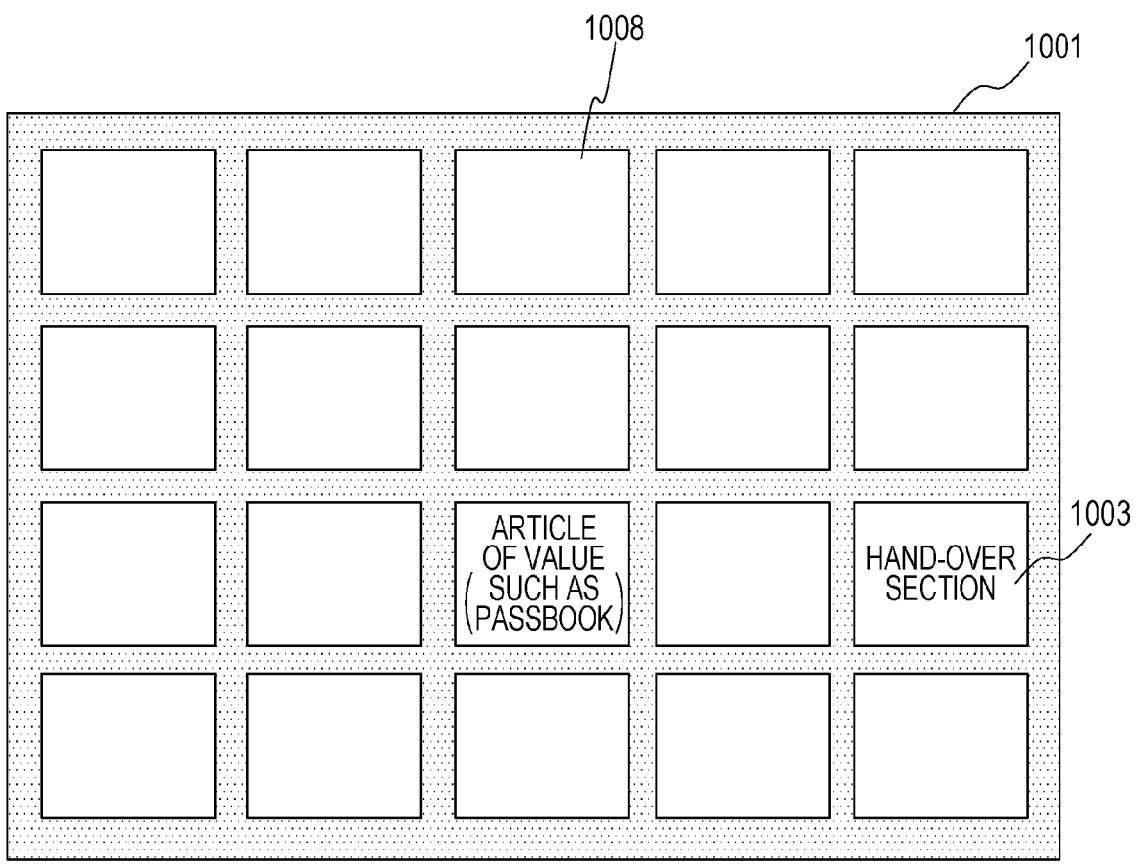
FIG. 24 is a diagram for illustrating an example of function of managing an article of value.

FIG. 24 is a diagram for illustrating an example of function of managing an article of value. As illustrated in FIG. 24, when the rack robot 1001 manages an article of value such as a passbook, information indicating the article of value may be managed as a flag. Specifically, a flag indicating whether or not a stored article is an article of value may be recorded in the stored article information DB 1207. Particularly, in some cases, an article of value such as a passbook may be withdrawn only when consent is obtained from the relevant family. Although consent from the relevant family may not be requested, the transport robot 1002 may have a function of confirming by asking, for example, "Are you really sure?".

Figure 25:
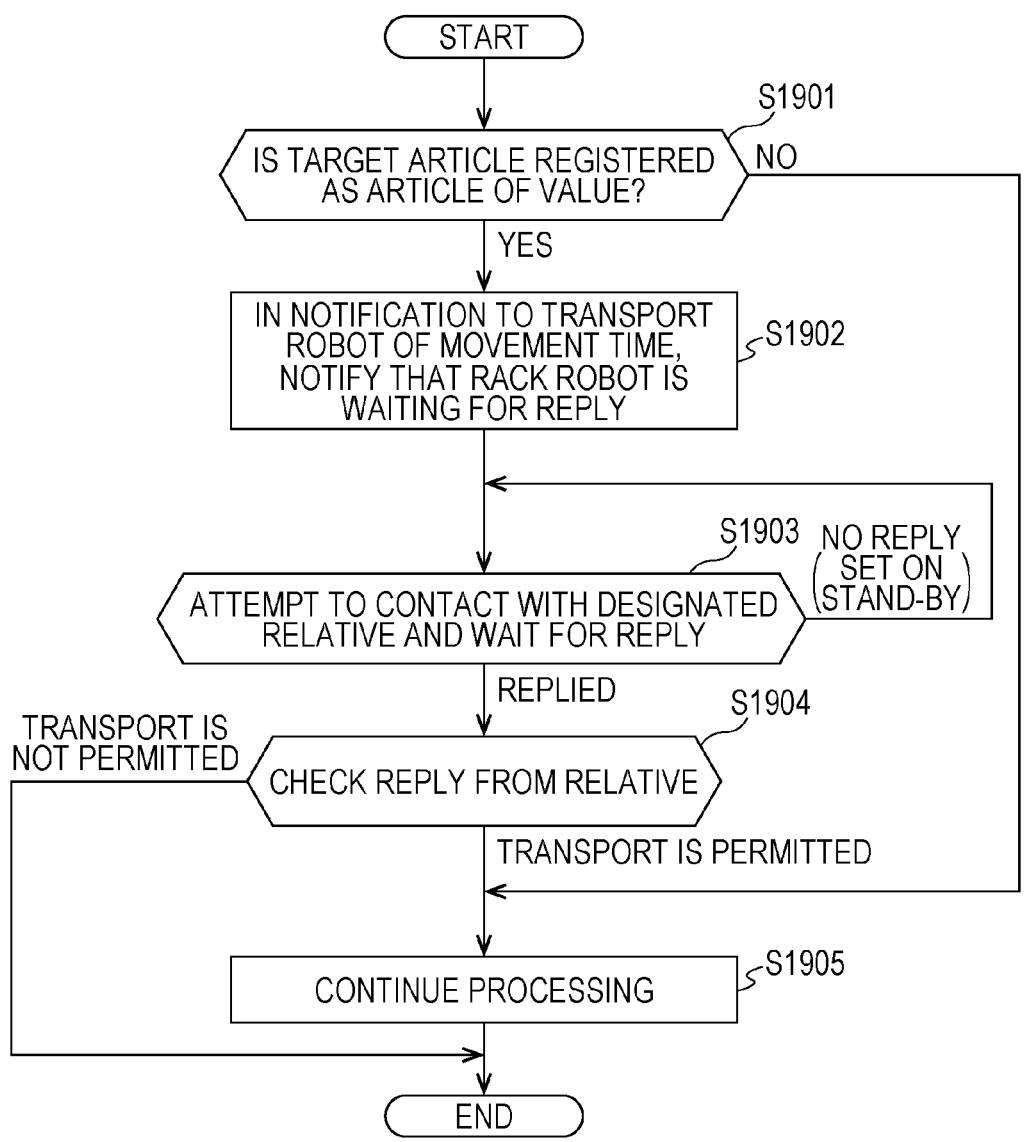
FIG. 25 is a flow chart illustrating an example of processing when an article of value is managed.

FIG. 25 is a flow chart illustrating an example of processing when an article of value is stored. Hereinafter, processing steps are described sequentially.

(S1901) The second control circuit 1044 in the rack robot 1001 confirms whether or not an article on a transport request is registered as an article of value. When the article is not registered as an article of value, the flow proceeds to step S1905. When the article is registered as an article of value, the flow proceeds to step S1902.

(S1902) When the second control circuit 1044 notifies the transport robot 1002 of a withdrawal time, the notification includes a stand-by command. The transport robot 1002, after receiving the notification, does not start to move and stays on stand-by on the site.

(S1903) The second control circuit 1044 contacts with a person (a relative in this example) other than a predetermined user and waits for a reply. In this contact, the second control circuit 1044 inquires of an information device owned by the person whether or not a transport request is permitted. When no reply is received, the second control circuit 1044 stays on stand-by for a certain time period, and after elapse of the time, confirmation processing is interrupted. When a reply is received, the flow proceeds to step S1904.

(S1904) The second control circuit 1044 confirms a reply from the relative. When the reply indicates permission, the flow proceeds to step S1905. When the reply indicates rejection, the processing is exited.

(S1904) The approval is notified to the transport robot 1002 which moves to the rack robot 1001 and continues the processing of transporting the article.

In this manner, when a request to withdraw an article of value is made by a user, the transport robot 1002 stays on stand-by until the approval of a person other than a user is obtained. This protects elderly people from a damage by fraud of stealing an article of value. Furthermore, in this case, the transport robot 1002 stays in the vicinity of a user for a time period while an inquiry to a family relative is being made, and thus change of request or cancellation by a user may be quickly coped with.

In the above-described example, only when the approval of a particular person other than a user is obtained, the second control circuit 1044 controls the conveyor mechanism 1048 to hand over an article to the transport robot 1002. Such control may be performed based on other conditions. For example, in a configuration where the transport robot 1002 issues a confirmation such as "Are you really sure?" by sound or display on a screen in response to a transport request, the conveyor mechanism 1048 may be driven only when the user confirms the final decision of the transport request. In this manner, only when particular conditions related to the requested article are satisfied, the second control circuit 1044 may control the conveyor mechanism 1048 to hand over the article to the transport robot 1002.

Next, the examples of design of the transport robot 1002 are described.

Figure 26A:
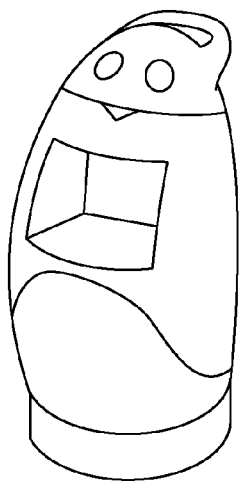
FIG. 26A is an illustration depicting an example of design of the transport robot 1002 that has a storage area for placing an article to be transported.
Figure 26B:
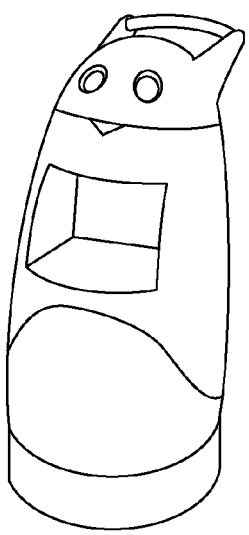
FIG. 26B is an illustration depicting an example of design of the transport robot 1002 that has a storage area for placing an article to be transported.
Figure 26C:
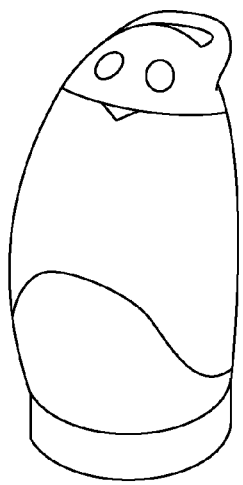
FIG. 26C is an illustration depicting an example of design of the transport robot 1002 that allows the storage area to be closed by a cover.
Figure 26D:
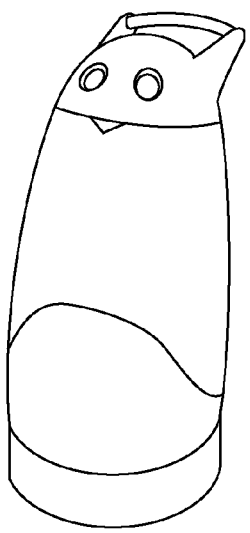
FIG. 26D is an illustration depicting an example of design of the transport robot 1002 that allows the storage area to be closed by a cover.

FIG. 26A is an illustration depicting an example of design of the transport robot 1002 that has a storage area for placing an article to be transported. FIG. 26B is an illustration depicting another example of design of the transport robot 1002 that has a storage area for placing an article to be transported. FIG. 26C is an illustration depicting an example of design of the transport robot 1002 that allows the storage area to be closed by a cover. FIG. 26D is an illustration depicting another example of design of the transport robot 1002 that allows the storage area to be closed by a cover. Like in these examples, it is also possible to cover the storage area by a cover. These examples of the transport robot 1002 have eyes each having a built-in sensor that performs distance image sensing. It is possible for a user to move the transport robot 1002 by a handle attached to the head of the transport robot 1002.

FIGS. 27A to 27D illustrate an example of dimensions of the transport robot 1002. FIGS. 27A to 27D respectively illustrate a front view, a left side view, a rear view, and a top view of the transport robot 1002. The dashed line in FIGS. 27B and 27D indicates the location of the storage area. In this example, the diameter of the bottom face is set to 30 cm to refrain from interfering in a house. The height is set to allow easy hand-over of an article and easy interaction with the transport robot 1002 when a user is sitting. The height of the base of the storage area is set to 45 cm and the entire height is set to 85 cm. The lower part of the body is provided with a portion (8 cm in height) that includes wheels. The front view of the storage area is a square with each side of 20 cm. These are example dimensions and the dimensions are not limited to this example.

FIGS. 28A to 28D illustrate another example of design of the transport robot 1002. Like this example, the transport robot 1002 may be designed to have a rounded outline so as to bring a sense of affinity. In the example of design of FIGS. 28A to 28D, when the transport robot 1002 is seen from the side, the ratio of the length of the low side to the length of the upper side of the portion (storage portion) that stores a transport article is higher than the ratio in the example of FIGS. 27A to 27D. With this design, when a user looks into the storage portion from a position higher than the storage portion, an article in the storage portion is easily seen. It is also easy to take out an article in the storage portion from a position higher than the storage portion. It is presumed that when the rack robot 1001 hands over an article stored in the rack robot 1001 to the transport robot 1002, the rack robot 1001 may hand over the article itself. On the other hand, it is also presumed that each rack in the rack robot 1001 may store a box which contains an article and the rack robot 1001 hands over the box containing the article to the transport robot 1002. Particularly in the case where a box containing an article is handed over to the transport robot 1002, since the higher ratio of the length of the low side to the length of the upper side of the storage portion for a transport article is high as illustrated in FIGS. 28A to 28D, the box containing an article is easily handed over from the rack robot 1001 to the transport robot 1002.

Figure 29:
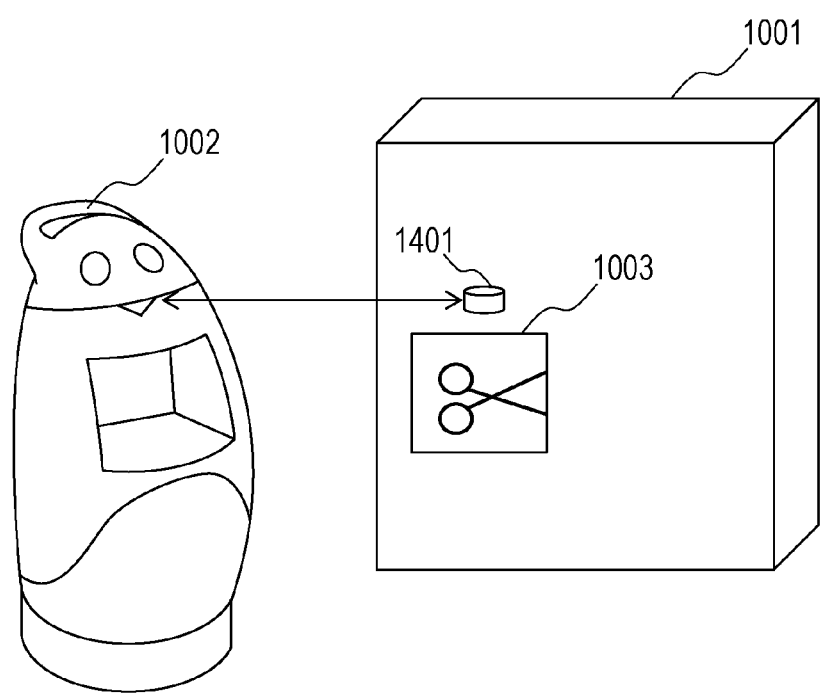
FIG. 29 is an illustration depicting an configuration example when positioning of the transport robot 1002 for handing out an article is made using a sensor for exclusive use.

FIG. 29 is an illustration depicting an configuration example when positioning of the transport robot 1002 for handing out an article is made using a sensor for exclusive use. The rack robot 1001 in this example includes a transmitter 1401 that emits infrared rays, in the vicinity of the hand-over section 1003. A sensor mounted in the transport robot 1002 detects infrared rays emitted by the transmitter 1401, thereby achieving accurate positioning.

According to the system of the present disclosure, since the transport robot is capable of transporting an article to the rack robot and transporting an article from the rack robot to a user according to a command of the user, the convenience of the life of the user in the house is increased.

What is claimed is:

1. An article management system, comprising:
a transport robot that transports an article; and
a rack robot that stores the article,
wherein the transport robot includes:
an input that receives a transport request from a user, the transport request including a request to transport the article handed by the user to the rack robot;
a first communication circuit that transmits the transport request to the rack robot; and
a movement that causes the transport robot to move toward the rack robot,
wherein the rack robot includes:
a second communication circuit that receives the transport request transmitted from the first communication circuit;
a conveyor that receives the article based on the transport request from the transport robot and moves the article to a predetermined storage location; and
a plurality of racks, within which the predetermined storage location is located, at least one of the plurality of the racks having a structure that allows a transporting entity to take the article in and out,
wherein the conveyor moves the article to the at least one of the plurality of the racks, when a frequency of the transport request related to the article is lower than a predetermined frequency, and
the second communication circuit transmits, to a server of the transporting entity, a delivery request for delivering the article to an external facility.

2. The article management system according to claim 1, wherein the movement comprises wheels and a motor.

* * * * *